(12) United States Patent
Nakano

(10) Patent No.: US 6,783,177 B1
(45) Date of Patent: Aug. 31, 2004

(54) SEATBACK FOR AUTOMOBILE

(75) Inventor: Nobuyuki Nakano, Kanagawa-ken (JP)

(73) Assignee: Ikeda Bussan Co. Ltd., Kanagawa-ken (JP)

(*) Notice: Subject to any disclaimer, the term of this patent is extended or adjusted under 35 U.S.C. 154(b) by 0 days.

(21) Appl. No.: 09/641,345

(22) Filed: Aug. 18, 2000

(30) Foreign Application Priority Data

Aug. 23, 1999 (JP) .......................................... P11-236075
Aug. 23, 1999 (JP) .......................................... P11-236081
Aug. 23, 1999 (JP) .......................................... P11-236102
Aug. 23, 1999 (JP) .......................................... P11-236107

(51) Int. Cl.[7] .............................................. B60N 2/42
(52) U.S. Cl. .................................. 297/216.12; 297/408
(58) Field of Search ........................... 297/216.12, 408, 297/410, 452.18, 452.2

(56) References Cited

U.S. PATENT DOCUMENTS

| | | | | | |
|---|---|---|---|---|---|
| 2,973,029 | A | * | 2/1961 | Schlosstein | 297/216.12 |
| 3,802,737 | A | * | 4/1974 | Mertens | 297/216.12 |
| 5,669,668 | A | * | 9/1997 | Leuchtmann | 297/408 |
| 5,681,079 | A | * | 10/1997 | Robinson | 297/61 |
| 5,795,019 | A | * | 8/1998 | Wieclawski | 297/216.12 |
| 5,823,619 | A | | 10/1998 | Heilig et al. | |
| 5,884,968 | A | * | 3/1999 | Massara | 297/216.12 |
| 6,199,947 | B1 | * | 3/2001 | Wiklund | 297/216.12 |
| 6,250,714 | B1 | * | 6/2001 | Nakano et al. | 297/216.12 |
| 6,375,262 | B1 | * | 4/2002 | Watanabe | 297/284.4 |
| 6,416,125 | B1 | * | 7/2002 | Shah et al. | 297/216.12 |
| 6,655,733 | B2 | * | 12/2003 | Humer et al. | 297/216.12 |

FOREIGN PATENT DOCUMENTS

| | | |
|---|---|---|
| DE | 296 03 991 U1 | 7/1996 |
| EP | 0 627 340 A1 | 12/1994 |
| GB | 2318045 | 4/1998 |
| JP | 50-006093 | 1/1975 |
| JP | 62-095644 | 5/1987 |
| JP | 6-38708 | 2/1994 |
| JP | 10000973 | 1/1998 |
| JP | 10-119619 | 5/1998 |
| JP | 10119619 | 5/1998 |
| JP | 2000-201770 A * | 7/2000 |
| JP | 2000-217660 A * | 8/2000 |
| JP | 2000-39194 A * | 2/2001 |
| WO | WO9809838 | 3/1998 |

OTHER PUBLICATIONS

Abstract, XS 0011792910 MA.

* cited by examiner

Primary Examiner—Peter M. Cuomo
Assistant Examiner—Joseph Edell
(74) Attorney, Agent, or Firm—Nath & Associates PLLC; Marvin C. Berkowitz; Derek Richmond

(57) ABSTRACT

A supporting member is for supporting a headrest. A pressure receiving member is attached to the supporting member. The pressure receiving member has a pressure receiving portion at a lower end thereof for a load to be applied to. A frame member is attached with the supporting member to be pivoted with the headrest. The frame member is a pair of side frames or an upper-cross member.

27 Claims, 19 Drawing Sheets

SEATBACK FOR AUTOMOBILE

BACKGROUND OF THE INVENTION

1. Field of the Invention

The present invention relates to an automobile seat back and particularly to an automobile seat back structure for protecting cervical vertebrae of a passenger of a subject car when another car bumps into a rear of the subject car.

2. Description of Relevant Art

As an automobile seat back, there is a seat back including a lateral frame member having rotary hinges on front sides of upper end portions of side frames and a portion for receiving pressure when another car bumps into a rear of a subject car as disclosed in Japanese Patent Application Laid-open No. 10-119619, for example.

Therefore, when another car bumps into the rear of the subject car, a forward impact load (first collision) is first applied to the seat back. Then a rearward reaction load (secondary collision) of a passenger is applied. In other words, the load is applied to the pressure receiving portion. At this time, the pressure receiving portion moves rearward. As a result, the lateral frame pivots forward about the rotary hinges on the front sides and a headrest supported by the lateral frame moves to a position corresponding to a head portion of the passenger. Thus, the headrest moves nearer to the head portion of the passenger. Therefore, if the seatback is bent rearward by the reaction load of the passenger in the subject car when another car bumps into the rear of the subject car, the pressure receiving portion instantaneously moves the headrest nearer to the head portion of the passenger by the principle of a lever by the reaction load. As a result, the head portion of the passenger is reliably received by the headrest and the cervical vertebrae of the passenger are protected.

As described above, since a square shape is formed by the side frames and the upper cross member, strength of the seat back is remarkably increased and a problem of deformation of the supporting member body for supporting the pressure receiving portion for receiving pressure of the secondary collision does not occur.

In a state in which the headrest pivots toward the front side to protect the neck of the passenger as a result of the secondary collision, a pivotal motion angle of the headrest toward the front side can be restricted by the stopper face. Therefore, it is possible to avoid generation of a problem of abnormal pivotal motion of the headrest toward the front side.

SUMMARY OF THE INVENTION

However, in such relevant art, since the rotary hinges are provided on the front sides, the rotary hinges are recognized as foreign matters when the seat back is pressed from the front side. Since the lateral frame member inclines forward, the member is liable to interfere with shoulder portions of the passenger, the movement of the lateral frame member may be stopped by the shoulder portions, and an amount of the forward movement of the headrest needs improvement.

The present invention has been accomplished with the above relevant art in view and provides an automobile seat back in which a feeling that there is a foreign matter is not provided to the passenger by a position of a pivotal motion center in forward movement of the headrest and the headrest can move forward by an amount corresponding to an amount by which the pressure receiving portion is pushed.

To achieve the object, a first aspect of the invention provides a seatback for an automobile. The seatback has a headrest; a supporting member for supporting the headrest; a pressure receiving member attached to the supporting member, the pressure receiving member has a pressure receiving portion at a lower end thereof for a load to be applied to; and a frame member attached with the supporting member to be pivoted with the headrest.

Preferably, the frame member is a pair of side frames.

Preferably, the frame member is an upper-cross member.

Preferably, the supporting member has a holder fitted with the headrest; and a supporting member body fixed with the holder and the pressure receiving member.

Preferably, the pressure receiving member is configured in a substantially I-shape between a lower end and an upper end thereof.

Preferably, the seatback further has a biasing means for biasing the pressure receiving portion to a front side. The biasing means is to be expanded by a predetermined load.

Preferably, the pressure receiving portion is covered with a cover made of a synthetic resin. The cover has a lock portion. The biasing means is hooked with the lock portion.

Preferably, the upper-cross member has a first stopper face for stopping the supporting member from pivoting when pivoting the supporting member forward.

Preferably, the upper-cross member has a second stopper face for stopping the supporting member from pivoting when pivoting the supporting member rearward.

Preferably, the holder is integrated with the pressure receiving member.

Preferably, the holder and the pressure receiving member are configured together in a substantially L-shape.

Preferably, the holder and the pressure receiving member are configured together in a substantially U-shape.

Preferably, the holder has a straight portion positioned at a central portion of an upper-cross member corresponding to an inside of shoulder portions of a passenger. The straight portion allows a stay of the headrest to be vertically moved. The pressure receiving member is configured in a thin and flat shape and is bent to be placed away from a pad.

Preferably, the upper-cross member is bridged between upper ends of a pair of side frames to be fixed.

A second aspect of the invention provides a seatback for an automobile. The seat back has a headrest; a supporting member having a distal end, a proximal end and an intermediate part, the supporting member being attached with the headrest at the distal end thereof, the supporting member for a load by a pressurizing element to be applied to at the proximal end thereof; and a pivotal element attached to the intermediate part of the supporting member, the pivotal element for pivoting the supporting member thereon with the headrest thereon by the load.

Preferably, the seatback further has a frame disposed between the pivotal element and the headrest. The frame engages with the intermediate part of the supporting member.

Preferably, the frame has a stopper part for the supporting member to be abutted against for stopping the supporting member from pivoting.

Preferably, the stopper part extends toward the proximal end of the supporting member.

Preferably, the stopper part extends in a transverse direction relative to the supporting member.

Preferably, the seatback further has a resilient member biasing the supporting member to an original position with a predetermined force.

Preferably, the resilient member is a spring bridged between a pair of side frames.

Preferably, the seatback further has a cover for covering the proximal end of the supporting member.

Preferably, the cover is made of a synthetic resin.

Preferably, the cover has a lock part. A resilient member is hooked with the lock part for biasing the supporting member to an original position.

Preferably, the supporting member has a flat plate part extending from the proximal end.

Preferably, the supporting member has a collar part enclosing the pivotal element; and a pressure receiving part fixed to the collar, the pressure receiving part extending from the proximal end of the supporting member.

Preferably, supporting member has a pressure receiving part extending from the proximal end; and a supporting body part fixed to the pressure receiving part, the supporting body part supporting the pivotal element.

Preferably, the supporting member has a holder part fixed to the supporting body part and fitted with the headrest.

Preferably, the holder part is integrated with the pressure receiving part.

Preferably, the seatback further has a frame engaged with the supporting member, the frame supporting the pivotal element.

As described above, since a pressure receiving member pivots forward and rearward and a supporting member for supporting a headrest through the upper end pivots forward and backward when the load due to the secondary collision of the passenger is applied to the pressure receiving portion disposed at the lower end of the pressure receiving member, a pivotal motion center is at a frame member, and thus, the feeling that there is the foreign matter is not provided to the passenger. Since the pressure receiving member that pivots with the headrest is in such a position as to be less liable to interfere with shoulder portions of the passenger, the headrest can move toward the front side and it is possible to reliably retain a neck of a passenger.

Since the square shape is formed by side frames and an upper cross member, strength of the seat back is remarkably increased and a problem of deformation of the upper cross member for supporting the pressure receiving portion for receiving pressure of the secondary collision does not occur.

Since an upper end of the pressure receiving member and the pressure receiving portion corresponding to the back portion of the passenger that is a position receiving an impact load accompanying the bumping of another car into the rear end of the subject car form a substantially I shape when viewed from front, an operating plate or the like for receiving pressure is unnecessary to reduce cost and there is only one vertical portion thereby remarkably reducing weight.

Since a pressure receiving portion of a pressure receiving member is continuously biased toward the front side and is disposed behind the biasing means that is not expanded by the load of sitting and is expanded only by an impact load accompanying the bumping of another car into the rear of the subject car, the biasing means is not expanded in response to the load of leaning of the passenger on his/her back in the normal sitting state of the passenger or in the relaxed state and the back can be retained. Since the biasing means can be expanded when the load due to the secondary collision as a result of the bumping of another car into the rear of the subject car is applied, the biasing means does not hinder the movement of the pressure receiving portion and the pressure receiving portion can move reliably.

Even if friction is produced between the biasing means and the pressure receiving portion, frictional sound is less liable to be generated because the cover made of synthetic resin is provided between the biasing means and the pressure receiving portion. Since biasing means is reliably locked by the lock portion formed on the cover, the biasing means is reliably prevented from being detached, however the pressure receiving member is pivoted.

As described above, since the supporting member for supporting the pressure receiving member pivots forward and backward when the load due to the secondary collision of the passenger is applied to the pressure receiving portion disposed at the lower end of the pressure receiving member, the headrest pivots forward and backward through the holder supported by the supporting member. At this time, since the pivotal motion center of the headrest is at the upper cross member, the feeling that there is the foreign matter is not provided to the passenger.

As described above, since a supporting member for supporting a headrest pivots forward and rearward with respect to side frames, the pivotal motion center is at the side frames and a feeling that there is a foreign matter is not provided to the passenger. Since the pressure receiving portion pivots about the upper ends of the side frames when the load due to the secondary collision of the passenger is applied to the pressure receiving portion, the pressure receiving portion is in such a position as to be less liable to interfere with the shoulder portions of the passenger. Therefore, the headrest can move toward the front side and it is possible to reliably retain a neck of a passenger.

Since it is possible to mold of one member, the cost of manufacture can be reduced and a reasonable seatback can be provided.

A pressure receiving portion and a holder are formed separately. Therefore, it is unnecessary to extend the holder to the pressure receiving portion though it is necessary to ensure a size of the holder sufficient to support the headrest. As a result, weight of the holder can be reduced and it is easy to manufacture the holder, and therefore, the cost of manufacture can be reduced significantly. Since the pressure receiving portion need only bear the load due to the secondary collision of the passenger, the pressure receiving portion may be a core and therefore, weight of the portion can be reduced.

Since a pressure receiving portion is continuously biased toward a front side and is disposed behind a biasing means that is not expanded by a load of sitting and expanded only by an impact load accompanying a bumping of another car into a rear of a subject car, the biasing means is not expanded in response to the load of leaning of the passenger on his/her back in a normal sitting state of a passenger or in a relaxed state and the back can be retained. Since the biasing means can be expanded when the load due to the secondary collision as a result of the bumping of another car into the rear of the subject car is applied, the biasing means does not hinder movement of the pressure receiving portion and the pressure receiving portion can move reliably.

Since a first stopper face of an upper cross member comes into contact with a supporting member in response to a load of leaning of a passenger on his/her back in a normal sitting state of a passenger or in a relaxed state, the supporting member does not pivot and a position of a headrest is retained. In a state in which a headrest pivots toward a front side to protect a neck of a passenger as a result of a secondary collision, since a supporting member interferes with a second stopper face of an upper cross member, the headrest does not further pivot toward a front side and it is possible to avoid generation of a problem of abnormal pivotal motion of the headrest toward a front side.

Since a pressure receiving portion and a holder are provided in a position receiving an impact load as a result of another car bumping into a rear of a subject car, and which corresponds to the position of the back of the passenger, and form a substantially U shape when viewed from a front, there are no projections; and consequently, to reduce cost, an operating plate or the like for receiving pressure is unnecessary.

Since a pressure receiving portion and holder are provided in a position receiving an impact load as the result of another car bumping into the rear of the subject car, and which corresponds to the position of the back of the passenger, and form a substantially L shape when viewed from the front, there are no projections; and consequently, to reduce cost, an operating plate or the like for receiving pressure is unnecessary. Since there is only one holder, weight can be reduced significantly.

Since the straight portion does not interfere with shoulder portions of a passenger, an amount of pivotal motion of a headrest toward a front side becomes large. Since a pressure receiving portion is thin in a front-to-rear direction, it is possible to prevent the pressure receiving portion from interfering with knees of the passenger in a rear seat. The pressure receiving portion is liable to receive a load due to a secondary collision of a passenger.

BRIEF DESCRIPTION OF THE ACCOMPANYING DRAWINGS

DETAILED DESCRIPTION OF THE PREFERRED EMBODIMENTS

First Embodiment

Figure 1:
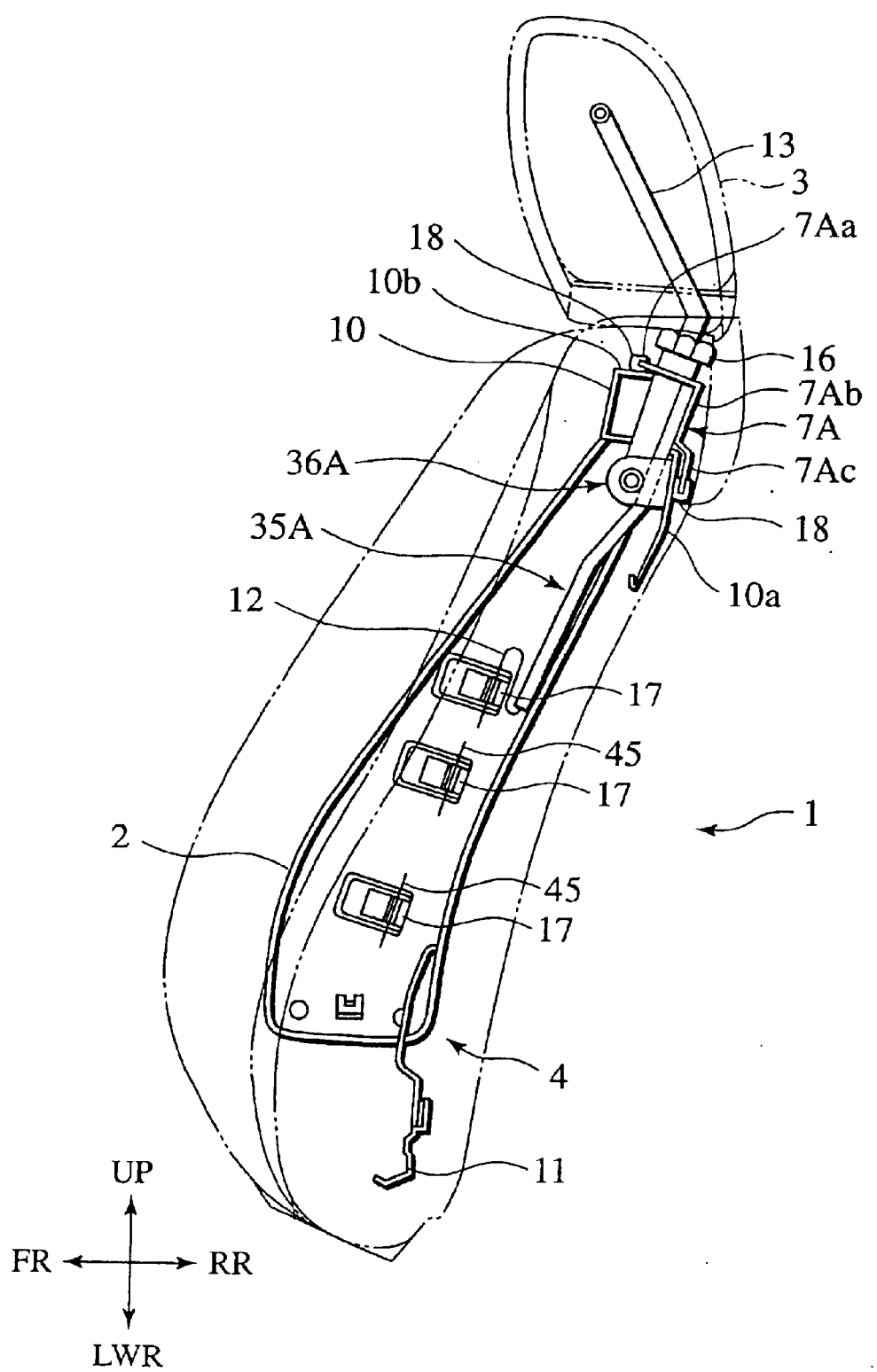
FIG. 1 is a vertical side view of a center of a seat back according to a first embodiment of the present invention.
Figure 2:
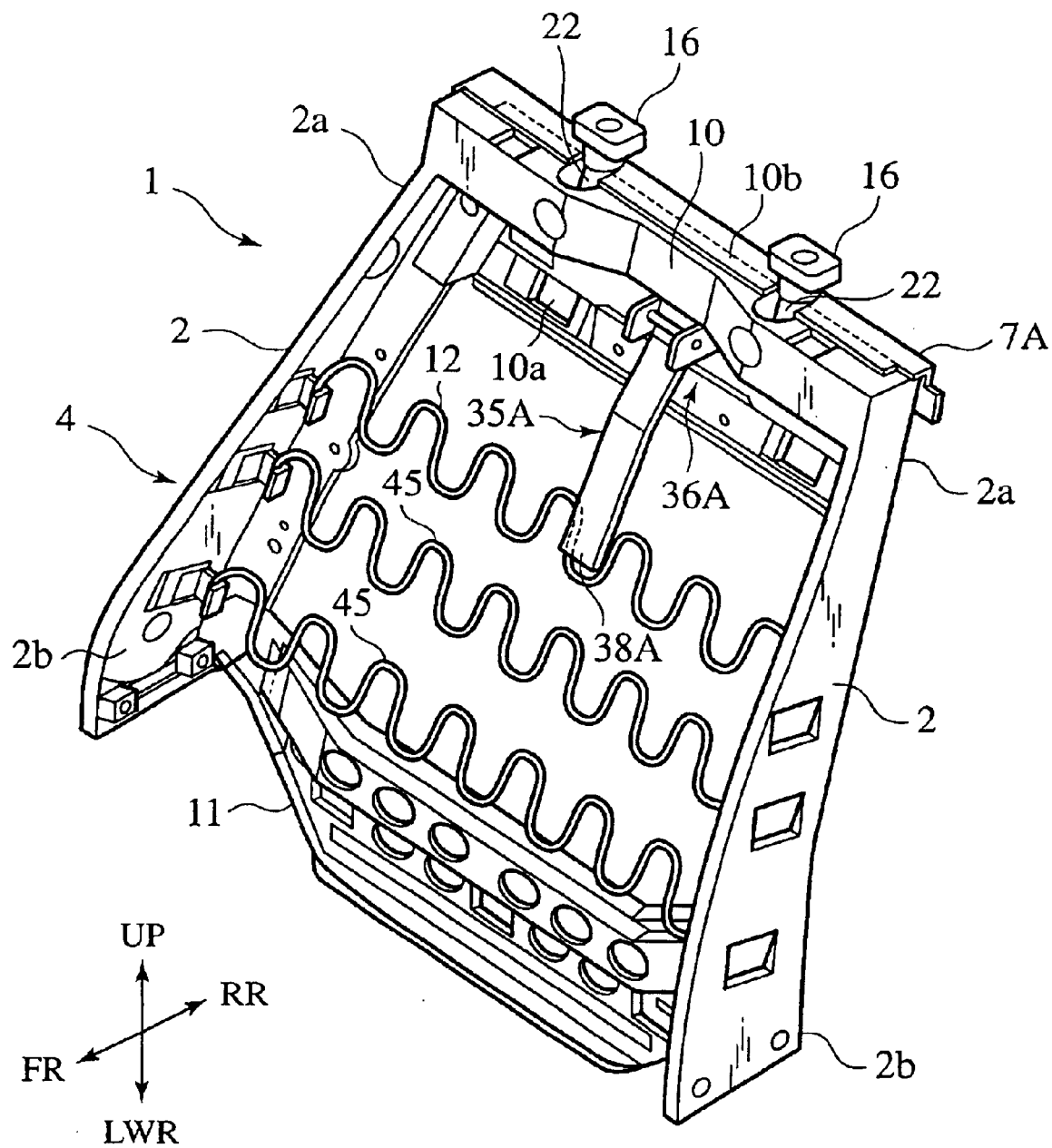
FIG. 2 is a perspective view of a seat back in FIG. 1.

A preferred embodiment of the present invention will be described below based on the drawings. Reference letters FR designates a front side, RR a rear side, UP an upper side, and LWR a lower side in the description.

As shown in FIGS. 1 to 4, the seat back 1 includes a seat back frame 4 having at least side frames 2 made of iron plates at opposite side portions, an upper cross member 10 disposed to extend laterally to bridge front sides FR of upper end portions 2a of the side frames 2 of the seat back frame 4, a pressure receiving member 35A in a plate shape formed by flattening a pipe and supported for forward and rearward pivotal motion by a rotary support device 36A of the upper cross member 10 which will be described later, the member 35A having a pressure receiving portion 38A disposed in a lower end position which may receive a secondary impact load accompanying bumping of another car into the rear of the subject car, a headrest support member 7A which is made of an iron plate supported by a weld GW on an upper end portion 37A of the pressure receiving member 35A and which is mounted laterally for pivotal motion in forward and rearward directions FR, RR as the pressure receiving member 35A pivots, and a lower cross member 11 mounted laterally and substantially horizontally to lower end portions 2b of the side frames 2.

The side frames 2, the upper cross member 10, and the lower cross member 11 are supported on one another by welding. Between the side frames 2, an active headrest return spring 12 which is "biasing means" and is not bent in normal use and ride comfort springs 45 which can be bent by a load in normal use are mounted laterally between the clips 17. The active headrest return spring 12 and the ride comfort springs 45 have the same S shapes but have significantly different spring constants as described above.

Figure 3:
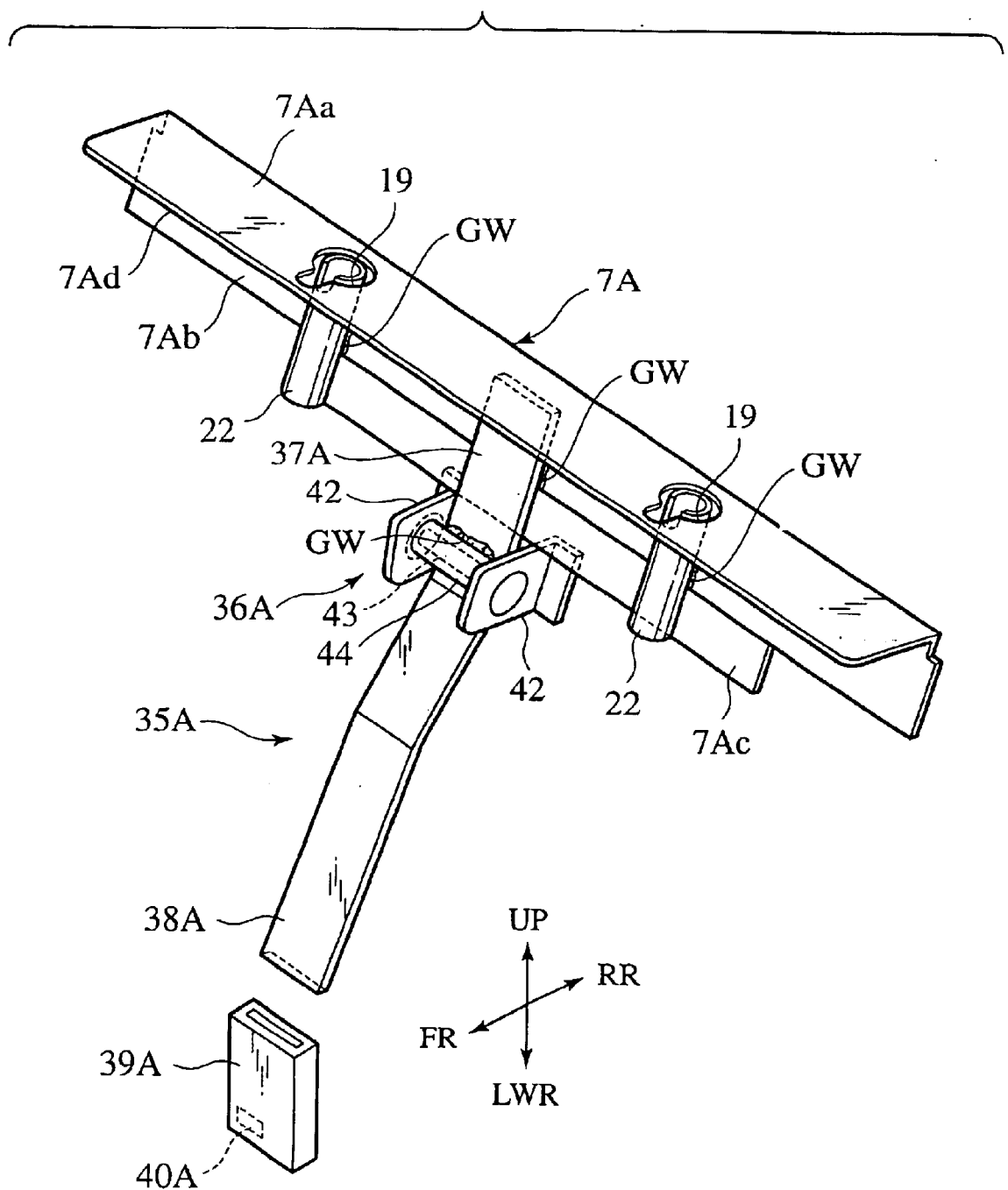
FIG. 3 is an enlarged perspective view of an essential portion of the seat back in FIG. 2.
Figure 4:
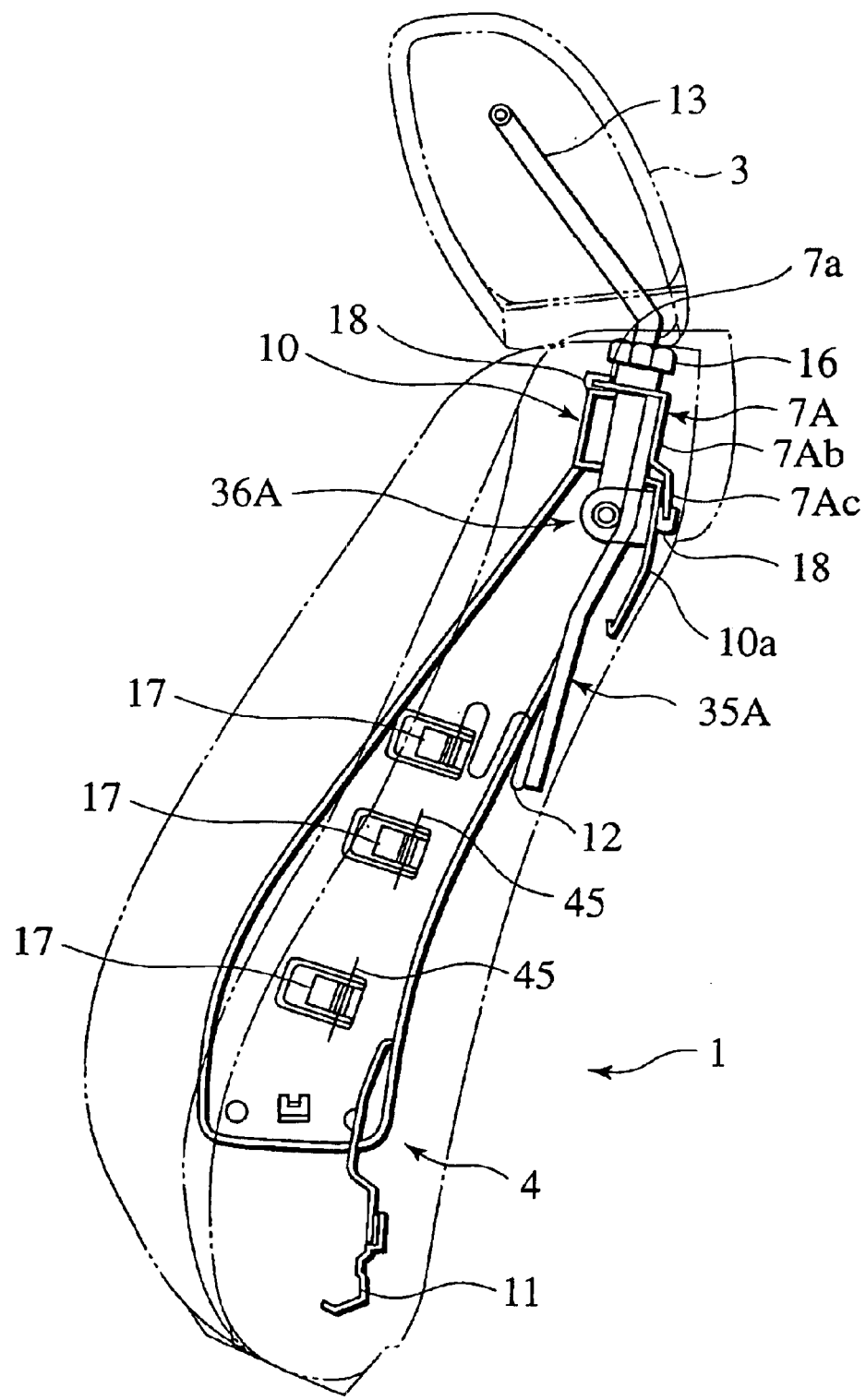
FIG. 4 is a vertical side view of the seat back in FIG. 1 after actuation.

As shown in FIG. 3, a lower end portion of the pressure receiving member 35A that is the pressure receiving portion 38A is covered with a cover 39A made of synthetic resin. When a portion of the active headrest return spring 12 is directly engaged with the cover 39A through a lock portion 40A, the pressure receiving portion 38A is continuously biased toward the front side FR. The active headrest return spring 12 has "spring force" such that the spring 12 is not expanded by a sitting load of a passenger (not shown) and is to be expanded only by a load of the secondary impact accompanying the bumping of another car into the rear of the subject car.

As shown in FIG. 3, the headrest support member 7A is formed by bending such that an upper face portion 7Aa having vertical through holes 19 through which upper end portions of hollow headrest holder brackets 22 are inserted and extending laterally and horizontally and a back face portion 7Ab extending downward from a rear end portion of the upper face portion 7Aa along a face of the pressure receiving member 35A on the rear side RR are perpendicular to each other. The upper end portion 37A of the pressure receiving member 35A is supported by the weld GW on the face of the back face portion 7Ab on the front side FR as described above. A lower end portion of the back face portion 7Ab is formed with a second stopper portion 7Ac extending downward in a position separated from a first stopper face 10a of the upper cross member 10.

A first stopper portion 7Ad is formed at a front end portion of the upper face portion 7Aa and shock-absorbing members 18 for preventing the first stopper portion 7Ad and the second stopper portion 7Ac from metallically coming into contact with the upper cross member 10 are respectively provided to the first stopper portion 7Ad and the second stopper portion 7Ac.

As shown in FIG. 1, the upper cross member 10 has an angular U shape in section with a front side FR closed and a rear side RR open and the first stopper face 10a extends downward along the rear side RR of the pressure receiving member 35A. If the load is applied when the passenger leans against the seat back, for example, the first stopper face 10a is pressed against the second stopper portion 7Ac through the shock-absorbing member 18, thereby retaining a position of the headrest 3. A stopper face 10b for preventing pivotal motion of the headrest support member 7A is formed such that the first stopper portion 7Ad of the headrest support member 7A comes into contact with the stopper face 10b through the shock-absorbing member 18 when the headrest support member 7A is pivoted toward the front side FR by means that will be described later.

Headrest holders 16 made of synthetic resin are respectively fitted into hollow portions of the headrest holder brackets 22 and stays 13 of the headrest 3 are respectively mounted to the headrest holders 16 for vertical movement. The pressure receiving portion 38A is disposed in a position in a vicinity of a back portion of the passenger (not shown) and near the front side FR. The stays 13 of the headrest 3 extend toward the upside UP to a predetermined position so as to go around portions corresponding to shoulder portions of the passenger (not shown) and are inclined toward the front side FR.

Lower end portions 13a of the stays 13 supported by the headrest holder brackets 22 are exposed from the headrest holder brackets 22. However, lower end portions of the headrest holder brackets 22 themselves are in the headrest support member 7A and do not project and the stays 13 are thin. Therefore, when the headrest 3 pivots toward the front side FR, the lower end portions 13a of the stays 13 pivoted toward the rear side RR project by only small amounts.

As shown in FIG. 3, the rotary support device 36A is formed of brackets 42 supported by welds GW on a face on the front side FR of the lower member 10a of the upper cross member 10, a pipe-shaped collar 44 supported by welding by the pressure receiving member 35A, and a pin 43 axially supported between the brackets 42 and axially supported for pivotal motion in the collar 44.

Next, operation according to the present embodiment will be described.

In a driving state in which the passenger is seated on a seat cushion of a seat formed of the seat back 1 and the seat cushion (not shown) and the passenger does not lean on his/her back against the seat back 1, there is a gap between a head portion of the passenger and the headrest 3 and a gap is also formed between the back of the passenger and the pressure receiving portion 38A. A pad, a skin member, and the like (not shown) are disposed between the back of the passenger and the pressure receiving portion 38A. If the seated passenger leans against the seat back 1 in a relaxed state, the load is applied by the back of the passenger, thereby bending the pad and the ride comfort springs 45. Therefore, the passenger can move toward the rear side RR, and thus, it is possible to softly receive the back of the passenger. As a result, sitting comfort is improved. Of course, the load is not applied to the pressure receiving portion 38A.

If another car bumps into the subject car in this state and an impact load is applied, a load to move the passenger toward the rear side RR is applied to the passenger. Since a value of impact accompanying the secondary collision is equal to or greater than a load by which the active headrest return spring 12 starts expanding, when the pressure receiving portion 38A is pivoted toward the rear side RR about the pin 43 between the brackets 42 of the rotary support device 36A, the active headrest return spring 12 starts expanding and the headrest support member 7A supported by the upper end portion 37A of the pressure receiving portion 38A pivots toward the front side FR about the rotary support device 36A. By this pivotal motion of the headrest support member 7A, the headrest 3 is controlled such that the headrest 3 is pivoted toward the front side FR through the stays 13 retained in the headrest holder brackets 22 supported by the headrest support member 7A. Therefore, it is possible to reliably retain the head portion of the passenger and to protect cervical vertebrae.

Since a pivotal motion center of the headrest 3 is on the lower member 10a side of the upper cross member 10, a feeling that there is a foreign matter is not provided to the passenger even though the rotary support device 36A is provided. Since the pressure receiving portion 38A pivots about the lower member 10a of the upper cross member 10 when the load due to the secondary collision of the passenger is applied to the pressure receiving portion 38A, the pressure receiving portion is in such a position as to be less liable to interfere with the shoulder portions of the passenger. Therefore, the headrest 3 can move toward the front side FR by a large amount and it is possible to reliably retain the neck of the passenger.

Even if friction is produced between the active headrest return spring 12 and the pressure receiving portion 38A, frictional sound is less liable to be generated because the cover 39A made of synthetic resin is provided between the active headrest return spring 12 and the pressure receiving portion 38A. Since the active headrest return spring 12 is reliably locked by the lock portion 40A formed on the cover 39A, the spring 12 is reliably prevented from being detached, however the pressure receiving member 35A is pivoted.

Since the back of the passenger moves toward the rear side RR due to the impact, the head portion of the passenger that should be left is reliably retained by movement of the headrest 3. Moreover, in this state, since only the lower end portions 13a of the stays 13 of the headrest 3 are thin, the lower end portions 13a of the stays 13 do not project toward the rear side RR and space is maintained between the lower end portions 13a and a passenger in a rear seat when the pressure receiving portion 38A moves toward the rear side RR.

Since the stays 13 of the headrest 3 are supported for vertical movement by the headrest holder 16, it is possible to properly adjust the headrest 3 to positions of the head portions of the passengers with different body sizes.

Since a square shape is formed by the side frames 2, the upper cross member 10, and the lower cross member 11, strength of the seat back 1 is remarkably increased and a problem of deformation of the headrest support member 7A for supporting the pressure receiving portion 38A for receiving pressure of the secondary collision does not occur.

Since the pressure receiving portion 38A of the pressure receiving member 35A is continuously biased toward the front side FR by the active headrest return spring 12, not expanded by a load of sitting, and expanded only by the impact load accompanying the bumping of another car into the rear of the subject car, the active headrest return spring 12 is not expanded in response to the load of leaning of the passenger on his/her back in a normal sitting state of the passenger or in the relaxed state, the headrest 3 does not move accidentally, and the back can be retained. Since the spring 12 can be expanded when the load due to the secondary collision as a result of the bumping of another car into the rear of the subject car is applied, the spring 12 does not hinder movement of the pressure receiving portion 38A and the pressure receiving portion 38A can move reliably.

In a state in which the headrest 3 pivots toward the front side FR to protect the neck of the passenger as a result of the secondary collision, a pivotal motion angle of the headrest 3 toward the front side FR can be restricted by the stopper face 10b of the upper cross member 10. Therefore, it is possible to avoid generation of a problem of abnormal pivotal motion of the headrest 3 toward the front side FR.

In the above description of the operation, the head portion of the passenger is said to be reliably protected by the movement of the headrest 3. The movement of the headrest 3 and the movement of the seat back 1 are relative to each other. The head portion of the passenger is protected because the headrest 3 does not move with respect to the head portion of the passenger and is retained in its position if the seat back 1 is moved toward the rear side RR by the back of the passenger.

Although the active headrest return spring is explained as an example of the "biasing means" in the above description, the "biasing means" may be a coil spring, a torsion coil spring, or a torsion bar suspended on the pressure receiving member 35A.

Second Embodiment

FIGS. 5 to 8 show an embodiment of the invention.

A seat back 1 is formed of a seat back frame 4 having at least side frames 2 made of iron plates at opposite side portions, an upper cross member 10 disposed to extend laterally and to bridge front sides FR of upper end portions 2a of the side frames 2 of the seat back frame 4, a headrest support member 7B made of an iron plate and supported for pivotal motion toward the front FR and rear RR sides by a rotary support device 36B fixed to the upper cross member 10, a pressure receiving member 35B in a plate shape supported at an upper end portion 37B by the headrest support device 7B through a weld GW so as to extend downward and having a pressure receiving portion 38B at a lower end portion for receiving a secondary impact load accompanying bumping of another car into the rear of the subject car, and a lower cross member 11 mounted laterally and substantially horizontally to lower end portions 2b of the side frames 2.

Figure 7:
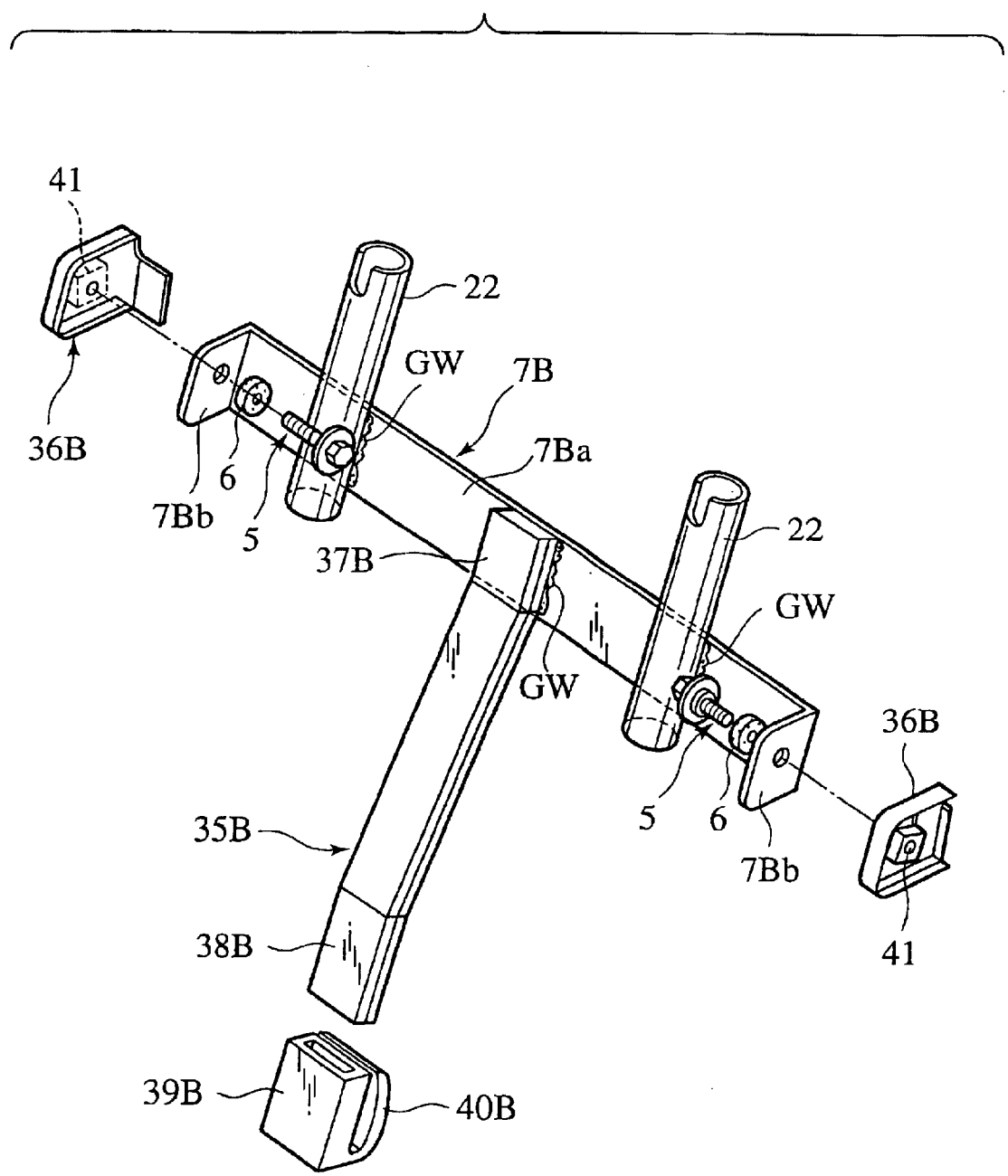
FIG. 7 is an enlarged perspective view of an essential portion of FIG. 6.
Figure 8:
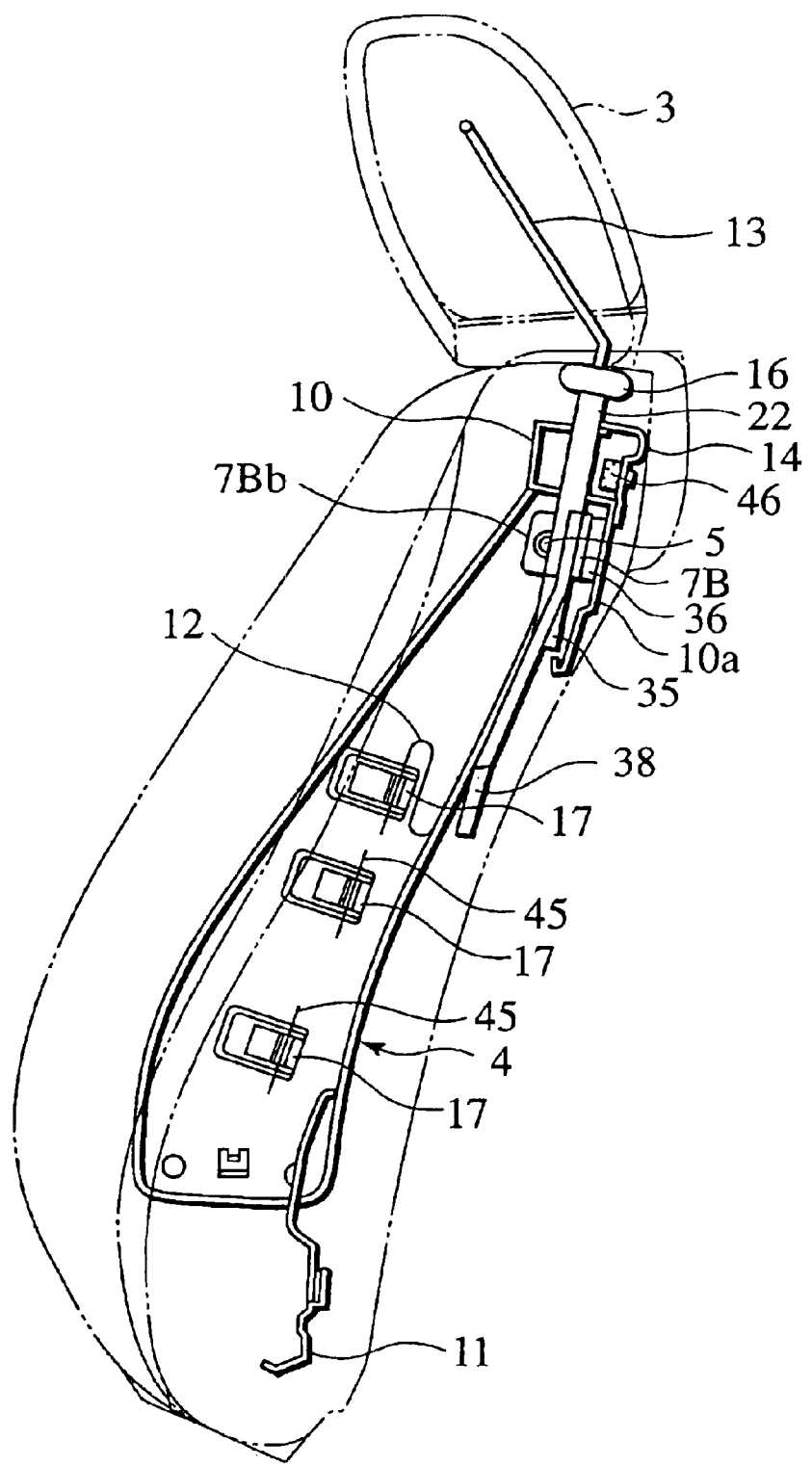
FIG. 8 is a vertical sectional view of the seat back in FIG. 5 after actuation.
Figure 9:
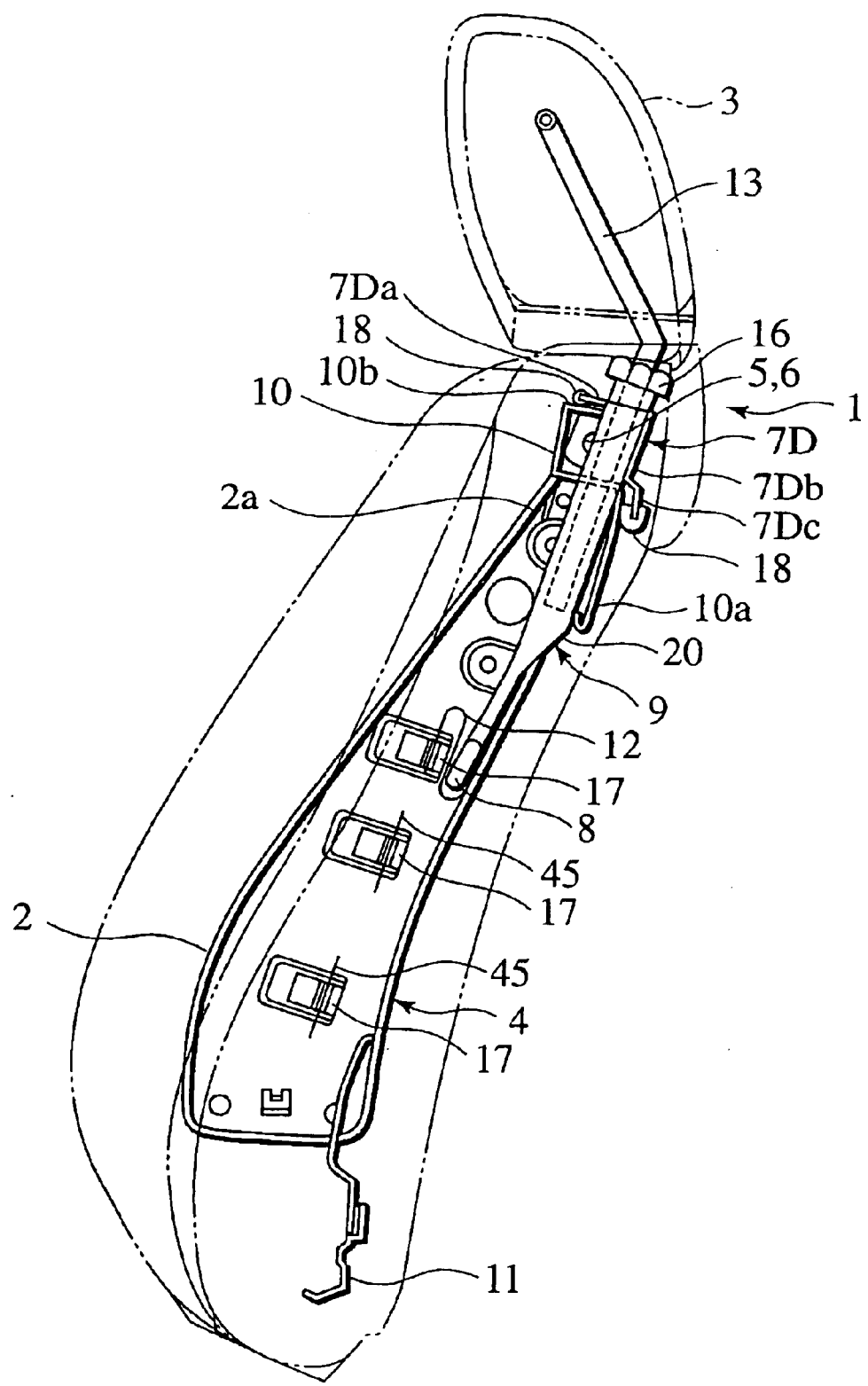
FIG. 9 is a vertical side view of a center of a seat back according to a third embodiment of the invention.
Figure 10:
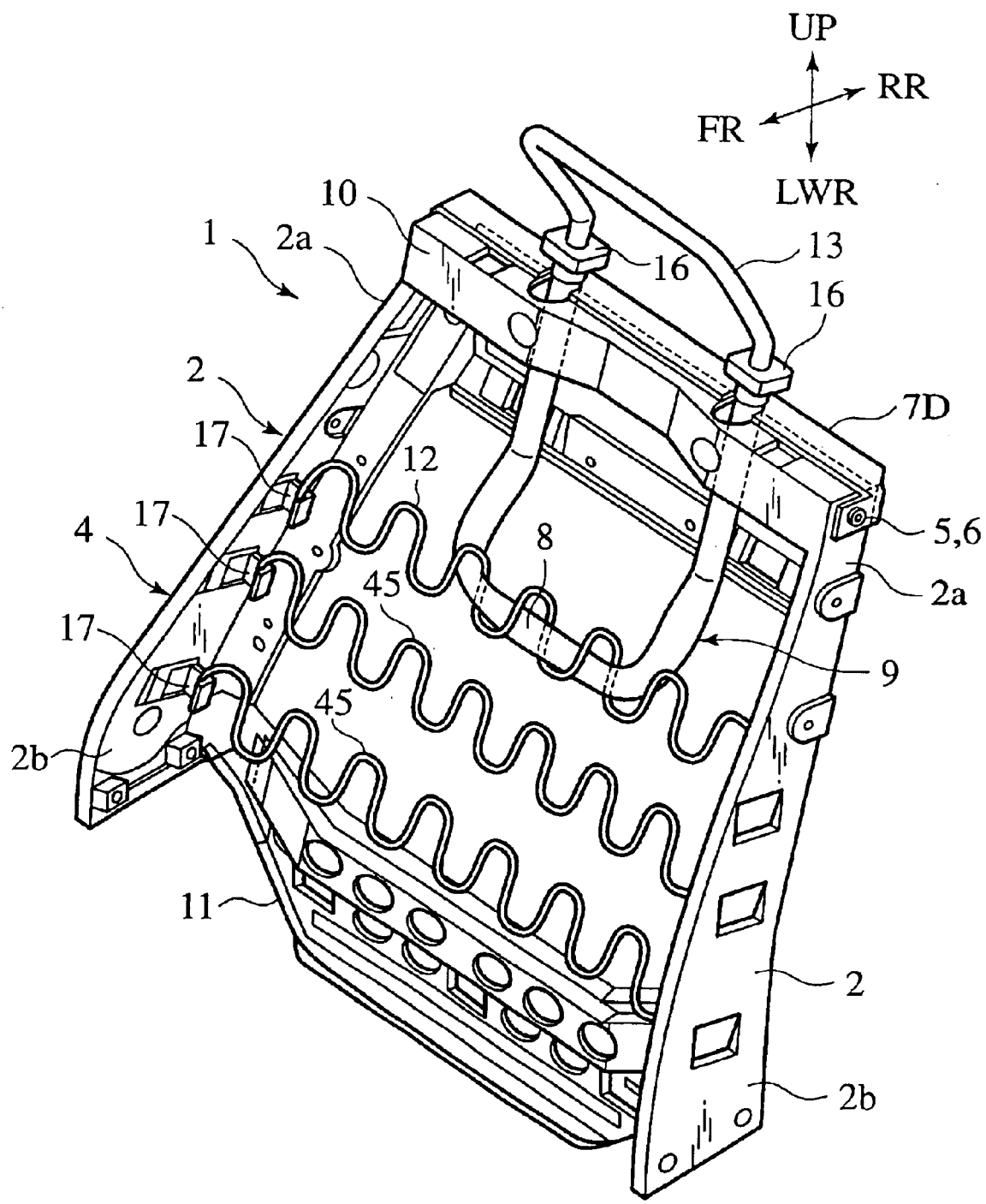
FIG. 10 is a perspective view of the seat back in FIG. 9.

As shown in FIG. 7, the headrest support member 7B is formed of a general portion 7Ba on which lower end portions of hollow headrest holder brackets 22 are supported through welds GW and which extends laterally and horizontally and support portions 7Bb formed by bending left and right end portions of the general portion 7Ba toward the front side FR. The support portions 7Bb can pivot toward the front FR and rear RR sides after predetermined fastening by screwing shoulder bolts 5 down into weld nuts 41 supported on the rotary support devices 36B through bushings 6 for absorbing frictional sound and impact in pivotal motion.

Active headrest return spring 12 is locked by the lock portion 40B formed on the cover 39B.

Figure 5:
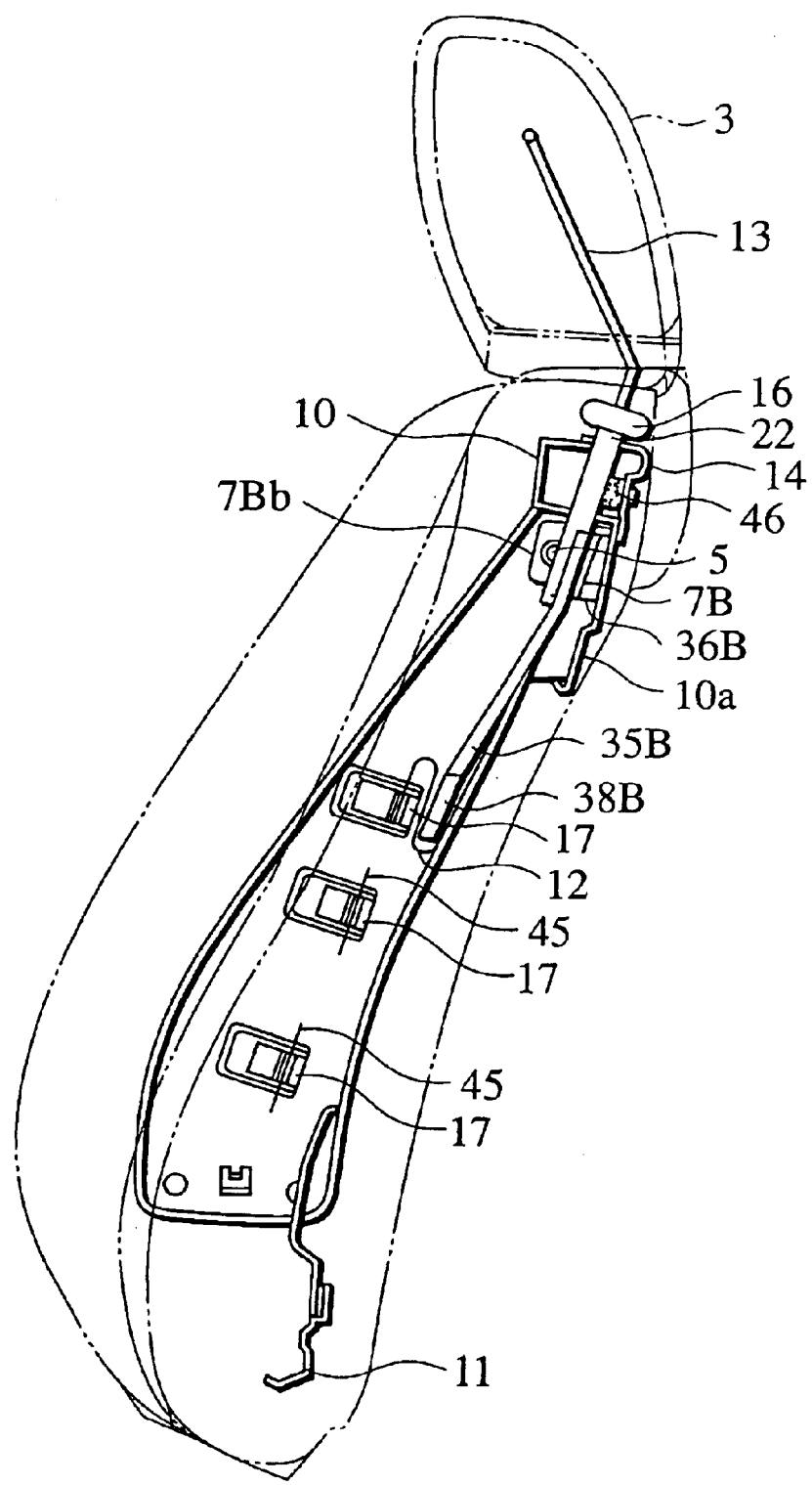
FIG. 5 is a vertical side view of a center of a seat back according to a second embodiment of the invention.
Figure 6:
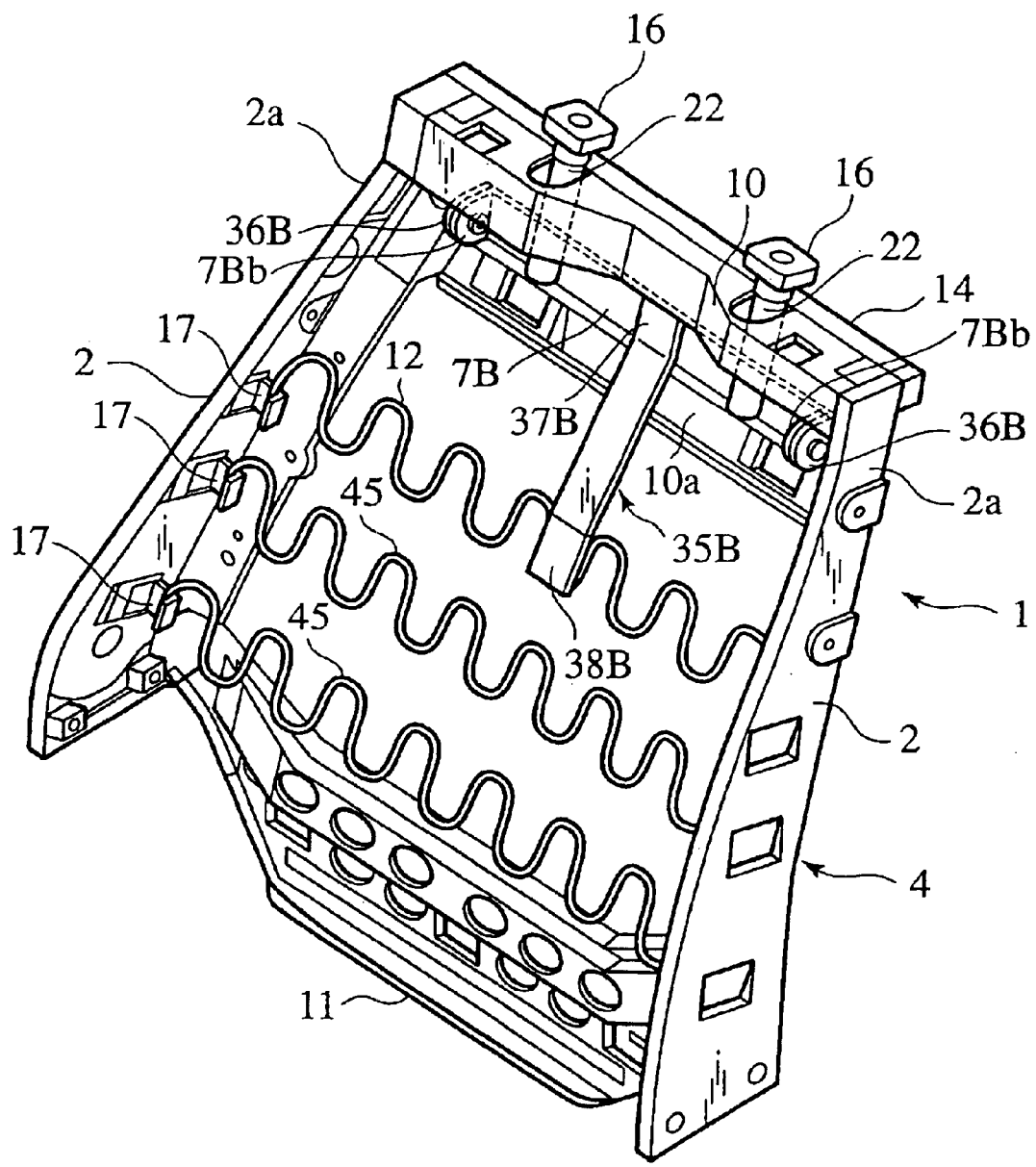
FIG. 6 is a perspective view of the seat back in FIG. 5.

As shown in FIG. 5, the upper cross member 10 has an angular U shape in section with a front side FR closed and a rear side RR open and a lower member 10a extends downward along a rear side RR of the pressure receiving member 35B. The rotary support device 36B is fixed to a face on the front side FR of the lower member 10a. Stoppers 46 made of rubber are disposed on a member 14 disposed on the rear side RR of the upper cross member 10 and right behind the headrest holder brackets 22. The stoppers 46 support the headrest holder brackets 22 from the rear side RR to bear a load of the head portion of the passenger and the like.

Next, operation according to the present embodiment will be described.

If another car bumps into the rear of the subject car and an impact load is applied, such a load as to move the passenger toward the rear side RR is applied to the passenger. Since a value of impact accompanying such a secondary collision is equal to or greater than a load by which the active headrest return spring 12 starts expanding, when the pressure receiving portion 38B is pivoted toward the rear side RR, the active headrest return spring 12 starts expanding and the upper end portion 37B of the pressure receiving member 35B is moved toward the front side FR. The headrest support member 7B supported by the upper end portion 37B pivots toward the front side FR about the rotary support device 36B. By this pivotal motion of the headrest support member 7B, the headrest 3 is controlled such that the headrest 3 is pivoted toward the front side FR through stays 13 retained in the headrest holder brackets 22, 22 supported by the headrest support member 7B. Therefore, it is possible to reliably retain the head portion of the passenger and to protect the neck of the passenger.

Third Embodiment

FIGS. 9 to 15 show an embodiment of the invention.

The seat back 1 is formed of a seat back frame 4 having at least side frames 2 made of iron plates at opposite side portions, a headrest support member 7D made of an iron plate and mounted laterally for pivotal motion toward the front FR and rear RR sides between rear sides RR of upper end portions 2a of the side frames 2 of the seat back frame 4 through shoulder bolts 5 and bushings 6 for absorbing frictional sound and impact in pivotal motion, hollow headrest holder brackets 9 having upper end portions 14a of straight portions 14 which will be described later supported by the headrest support member 7D through welds GW, and a pressure receiving portion 8 disposed in such a position as to receive a secondary impact load accompanying bumping of another car into the rear of the subject car. In this embodiment, the headrest holder brackets 9 and the pressure receiving portion 8 are formed integrally and have a U shape when viewed from front.

The seat back frame 4 is formed of the side frames 2, an upper cross member 10 mounted laterally and substantially horizontally between front sides FR of the upper end portions 2a of the side frames 2, and a lower cross member 11 mounted laterally and substantially horizontally between lower end portions 2b of the side frames 2 and the side frames 2, the upper cross member 10, and the lower cross member 11 are supported on one another by welding. Between the side frames 2, an active headrest return spring 12 which is "biasing means" and is not bent in normal use and ride comfort springs 45 which can be bent by a load in the normal use are disposed laterally between the clips 17. The active headrest return spring 12 and the ride comfort springs 45 have the same S shapes but have significantly different spring constants as described above.

Figure 11:
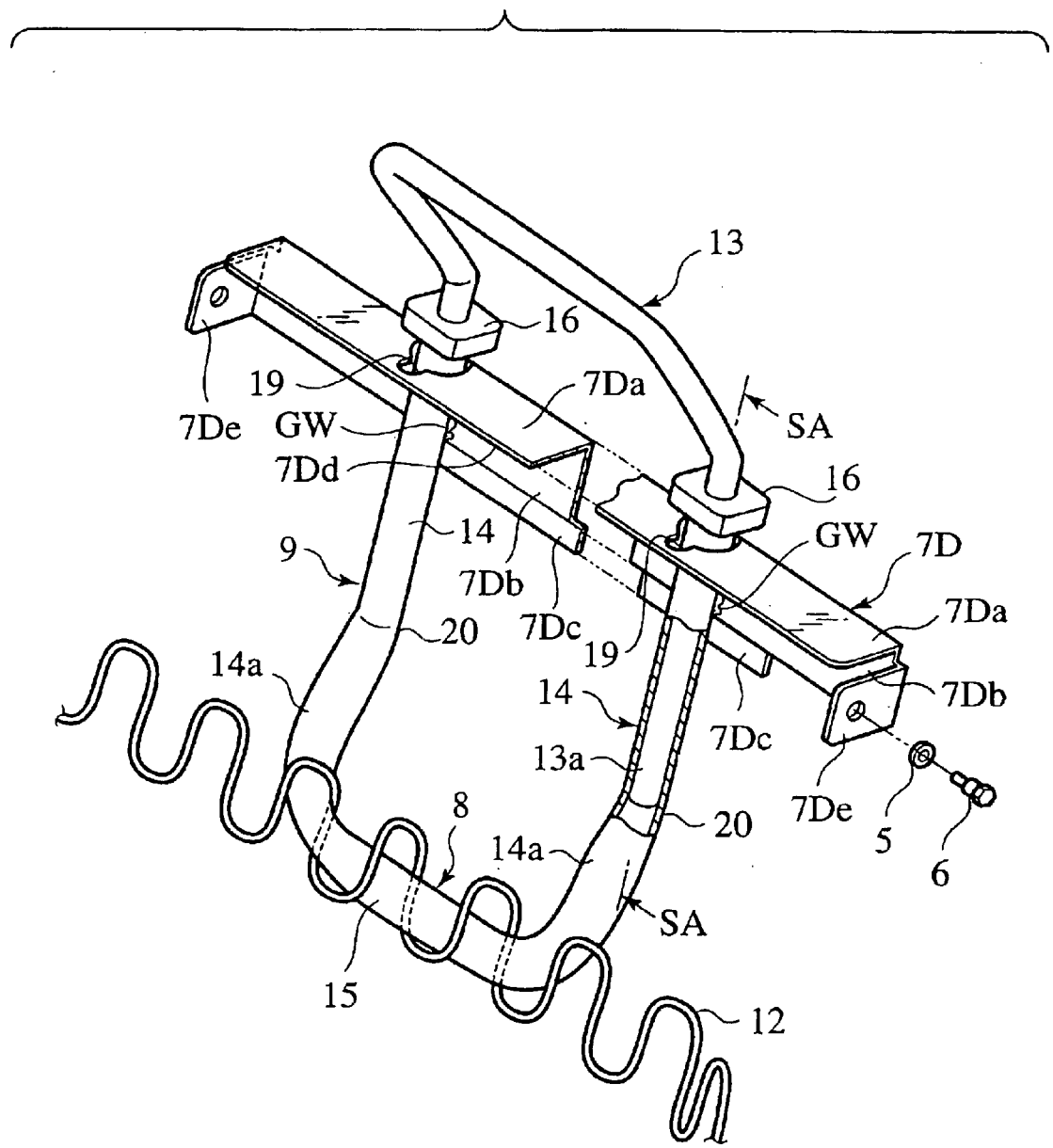
FIG. 11 is an enlarged perspective view of an essential portion of the seat back in FIG. 10.

As shown in FIG. 11, since a part of the active headrest return spring 12 is directly engaged with the pressure receiving portion 8, the pressure receiving portion 8 is continuously biased toward the front side FR. The active headrest return spring 12 has "spring force" such that the spring 12 is not expanded by a sitting load of a passenger (not shown) and can be expanded only by a load of the secondary impact accompanying the bumping of another car into the rear of the subject car.

Figure 12:
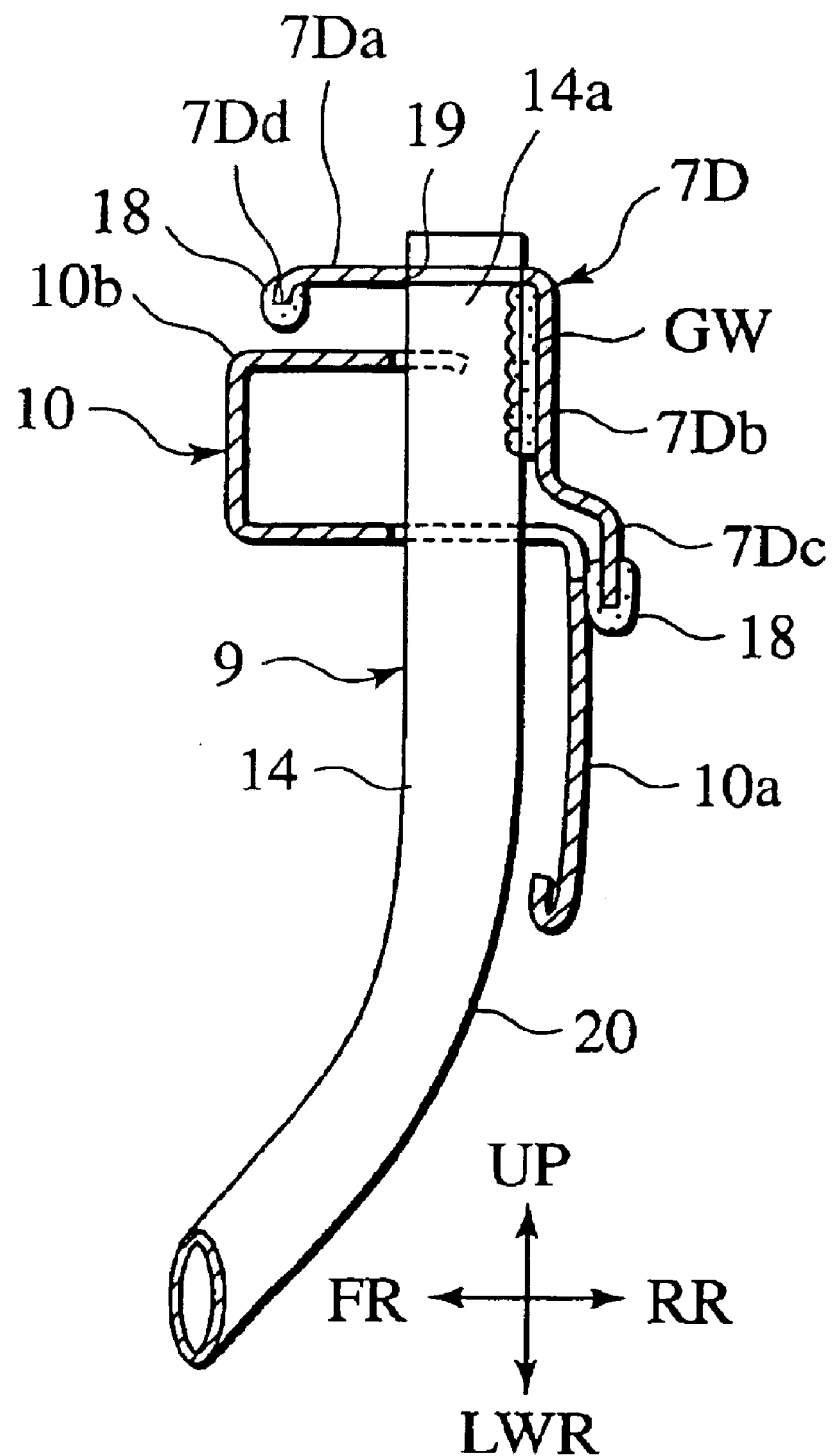
FIG. 12 is a sectional view taken along a line SA—SA in FIG. 11.

As shown in FIG. 12, the headrest support member 7D is formed by bending such that an upper face portion 7Da having vertical through holes 19 through which the headrest holder brackets 9 are inserted and extending laterally and horizontally and a back face portion 7Db extending downward from a rear end portion of the upper face portion 7Da along rear sides RR of the headrest holder brackets 9 are perpendicular to each other. A front FR face of the back face portion 7Db and the headrest holder brackets 9 are supported on one another by welding. A lower end portion of the back face portion 7Db is formed with a second stopper portion 7Dc extending downward in a position separated from a first stopper face 10a of the upper cross member 10 which will be described later. Interposed portions 7De are formed by bending left and right opposite end portions of the back face portion 7Db toward the front side FR.

A first stopper portion 7Dd is formed at a front end portion of the upper face portion 7Da and shock-absorbing members 18 for preventing the first stopper portion 7Dd and the second stopper portion 7Dc from metallically coming into contact with the first stopper face 10a and a second stopper face 10b which will be described of the upper cross member 10 are respectively provided to the first stopper portion 7Dd and the second stopper portion 7Dc.

As shown in FIG. 12, the upper cross member 10 has an angular U shape in section with a front side FR closed and a rear side RR open and the first stopper face 10a extends downward along the rear sides RR of the headrest holder brackets 9. If the load is applied to the headrest 3 when the passenger leans against the seat back 1, the first stopper face 10a is pressed against the second stopper portion 7Dc of the headrest support member 7D through the shock-absorbing member 18, thereby preventing pivotal motion of the headrest support member 7D. The second stopper face 10b for preventing pivotal motion of the headrest support member 7D toward the front side is formed such that the first stopper portion 7Dd of the headrest support member 7D comes into contact with the second stopper face 10b through the shock-absorbing member 18 when the headrest support member 7D is pivoted toward the front side FR by means that will be described later. Although the portion designated by a reference numeral 18 appears to be in contact with the portion designated by 10b in FIG. 9, the first stopper portion 7Dd of the headrest support member 7D is separated from the second stopper face 10b though the shock-absorbing member 18 is disposed therebetween as shown in FIG. 12 when the secondary collision load is not applied.

Each the headrest holder bracket 9 is formed of the straight portion 14 projecting slightly upward UP from the upper face portion 7Da of the headrest support member 7D and mostly extending downward and a curved portion 14a curved slightly forward from the straight portion 14. In the straight portions 14, leg portions of the headrest holders 16 made of synthetic resin are fitted and a stay 13 of the headrest 3 is mounted for vertical movement to the headrest holders 16. A rear portion at a boundary between the straight portion 14 and the curved portion 14a forms a bent portion 20 bent forward into a V shape with an obtuse angle when viewed from a side as shown in FIG. 12. The bent portion 20 is formed in a position close to the lower end portion 13a of the stay 13 of the headrest 3 as the bent portion 20 does not interfere with the lower end portion 13a and an inner face of the curved portion 20 is a curved face with a radius of 20 mm as shown in FIG. 11.

The straight portions 14 are arranged laterally when viewed from front and are vertical. Retained positions of the straight portions 14 are displaced toward a center from shoulder points of at least AF05% tile mannequin (SAE). This means that the straight portions 14 are displaced toward the center in a lateral direction from shoulder points of most passengers with an adult size of a body. Therefore, if the load of the passenger from the front side FR of the seat back frame 4 is applied, i.e., the passenger is pushed from the front side FR against the seat back 1 due to bumping of another car into the rear of the subject car, the shoulder points of the passenger do not interfere with the straight portions 14.

The pressure receiving portion 8 is disposed in a vicinity of a back portion of the passenger (not shown) and displaced forward FR and is formed by flattening into a thin and planar shape in a front FR-to-rear RR direction to have a predetermined width in a vertical direction.

The stay 13 of the headrest 3 extends upward to a predetermined position so as to go around a portion corresponding to shoulder portions of the passenger (not shown) and inclines forward FR.

Next, operation according to the present embodiment will be described.

When another car bumps into the rear of the subject car, the impact load toward the front side FR is applied first and then a load that moves the passenger toward the rear side RR, i.e., the secondary impact load is applied to the passenger. Since a value of impact accompanying such a secondary collision is equal to or greater than a load by which the active headrest return spring 12 starts expanding, when the pressure receiving portion 8 is moved toward the rear side RR, the active headrest return spring 12 starts expanding, the headrest holder brackets 9 starts pivoting in response to the movement of the pressure receiving portion 8, and the headrest support member 7D for supporting the headrest holder brackets 9 pivots toward the front side FR about the shoulder bolts 5 and the bushings 6. Thus, the headrest 3 is controlled such that the headrest 3 is pivoted toward the front side FR through the stay 13. Therefore, it is possible to reliably retain the head portion of the passenger and to protect the neck of the passenger.

Since the pivotal motion center of the headrest 3 is at the interposed portions 7De provided to the side frames 2, a feeling that there is a foreign matter is not provided to the passenger even though the shoulder bolts 5 are provided. Since the pressure receiving portion 8 pivots on the upper end portions 2a of the side frames 2 when the load due to the secondary collision of the passenger is applied to the pressure receiving portion 8, the pressure receiving portion 8 is in such a position as to be less liable to interfere with the shoulder portions of the passenger. Therefore, the headrest 3 can move toward the front side FR and it is possible to reliably retain the neck of the passenger.

Since the shoulder points of the passenger correspond to the shoulder points of at least the AF05% tile mannequin, a pad (not shown) does not bit into the straight portions 14 of the headrest holder brackets 9. Therefore, the straight portions 14 can move smoothly on a rear face of the pad, upward movement UP of the pad due to pivotal motion of the straight portions 14 is not hindered, and a sufficient operating amount of the headrest 3 can be ensured.

Since the back of the passenger moves toward the rear side RR due to the impact, the head portion of the passenger that should be left is reliably retained by movement of the headrest 3. Moreover, in this state, since the lower end portions of the straight portions 14 are bent forward into the V shape with the obtuse angle, the pressure receiving portion 8 does not project toward the rear side RR and space is maintained between the pressure receiving portion 8 and a passenger in a rear seat when the pressure receiving portion 8 moves toward the rear side RR.

Since the stay 13 of the headrest 3 is supported for vertical movement by the headrest holder 16, it is possible to properly adjust the headrest 3 to positions of the head portions of the passengers with different body sizes.

Since a square shape is formed by the side frames 2, the upper cross member 10, and the lower cross member 11, strength of the seat back 1 is remarkably increased and a problem of deformation of the headrest support member 7D for supporting the pressure receiving portion 8 for receiving pressure of the secondary collision does not occur.

Since the pressure receiving portion 8 is continuously biased toward the front side FR by the active headrest return spring 12, not expanded by a load of sitting, and expanded only by the impact load accompanying the bumping of another car into the rear of the subject car, the active headrest return spring 12 is not expanded in response to the load of leaning of the passenger on his/her back in a normal sitting state of the passenger or in the relaxed state, it is possible to comfortably retain the back portion of the passenger by the ride comfort springs 45. Since the active headrest return spring 12 can be expanded when the load due to the secondary collision as a result of the bumping of another car into the rear of the subject car is applied, there is no hindrance to movement of the pressure receiving portion 8 and the pressure receiving portion 8 can move reliably.

In a state in which the headrest 3 pivots toward the front side FR to protect the neck of the passenger as a result of the secondary collision, a pivotal motion angle of the headrest 3 toward the front side FR can be restricted by the stopper face 10b of the upper cross member 10. Therefore, it is possible to avoid generation of a problem of abnormal pivotal motion of the headrest 3 toward the front side FR.

Since the pressure receiving portion 8 is provided in a position corresponding to the back portion of the passenger which is a position receiving the impact load accompanying the bumping of another car into the rear of the subject car and forms a substantially U shape with the straight portions 14 when viewed from front, there is no inside projections such as acute angles and an operating plate or the like for receiving pressure is unnecessary to reduce cost.

Figure 13:
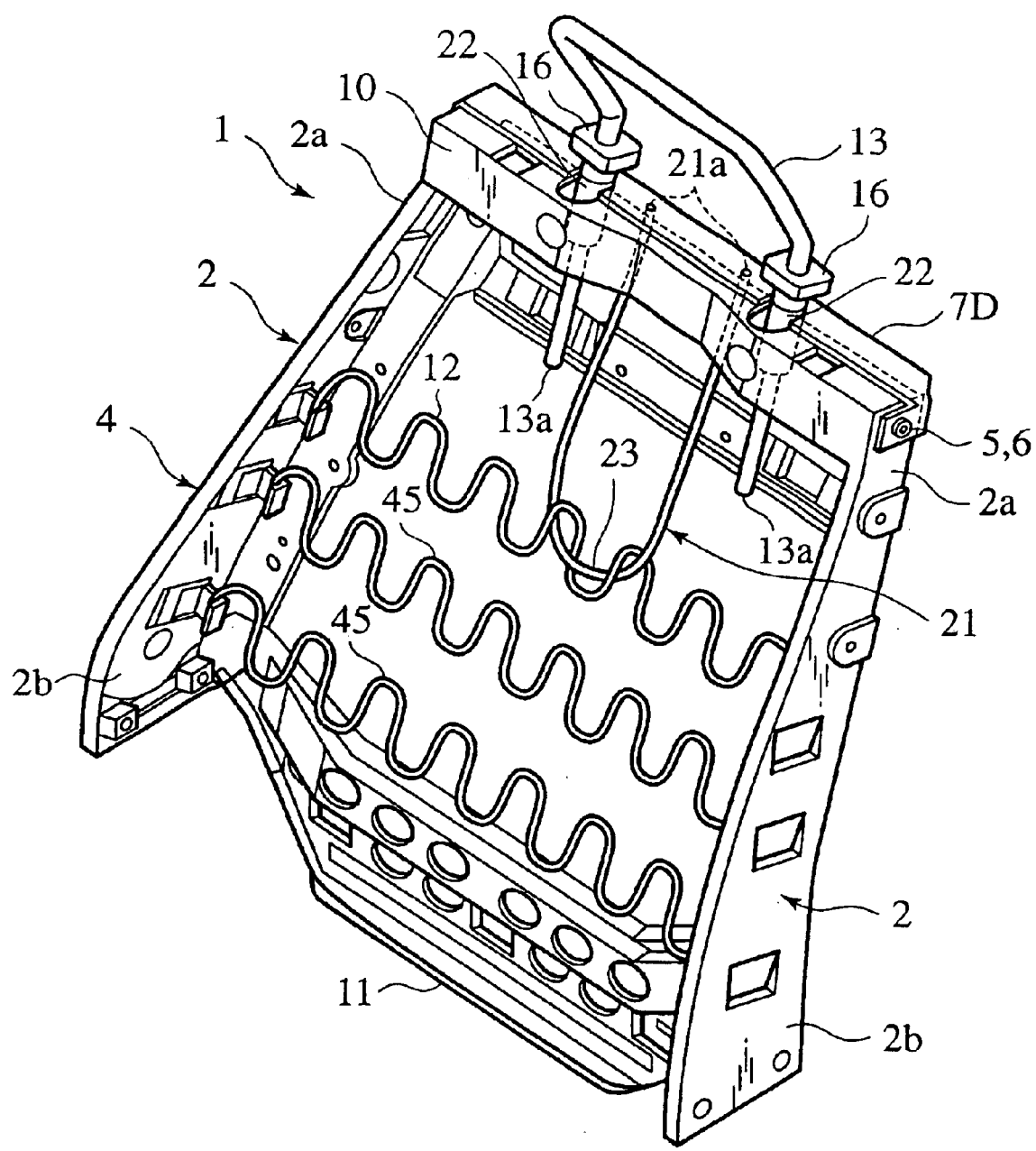
FIG. 13 is a perspective view of headrest holder brackets according to another embodiment of the invention.

FIG. 13 shows another embodiment of the pressure receiving portion and the headrest holder brackets. The pressure receiving member 21 in this embodiment is a solid round bar and is formed separately from retaining members 22 as "headrest holder brackets" in shapes of hollow pipes retaining the headrest holders 16. Upper end portions 21a of the pressure receiving member 21 and the retaining members 22 are supported on a front FR face of a back face portion 7Db of the headrest support member 7D by welding. An active headrest return spring 12 is directly engaged with a U-shaped pressure receiving portion 23 of the pressure receiving member 21.

In such a pressure receiving member 21, when another car bumps into the rear of the subject car and the impact load is applied, a load that moves the passenger toward the rear side RR is applied to the passenger. Since a value of impact accompanying such a secondary collision is equal to or greater than a load by which the active headrest return spring 12 starts expanding, when the pressure receiving portion 23 is moved toward the rear side RR, the active headrest return spring 12 starts expanding, the pressure receiving member 21 formed with the pressure receiving portion 23 starts pivoting, and the headrest support member 7D for supporting the pressure receiving member 21 is pivoted toward the front side FR on the shoulder bolts 5 and the bushings 6. Thus, by the pivotal motion of the headrest support member 7D, the retaining member 22 pivots and the headrest 3 is controlled such that the headrest 3 is pivoted toward the front side FR through the stay 13 supported by the retaining member 22. Therefore, it is possible to reliably retain the head portion of the passenger and to protect the neck of the passenger. Since the lower end portions 13a of the headrest stay 13 are exposed, the lower end portions 13a of the stay 13 are formed to be thin and project toward the rear side RR by a small amount when the headrest 3 pivots toward the front side FR.

Figure 14:
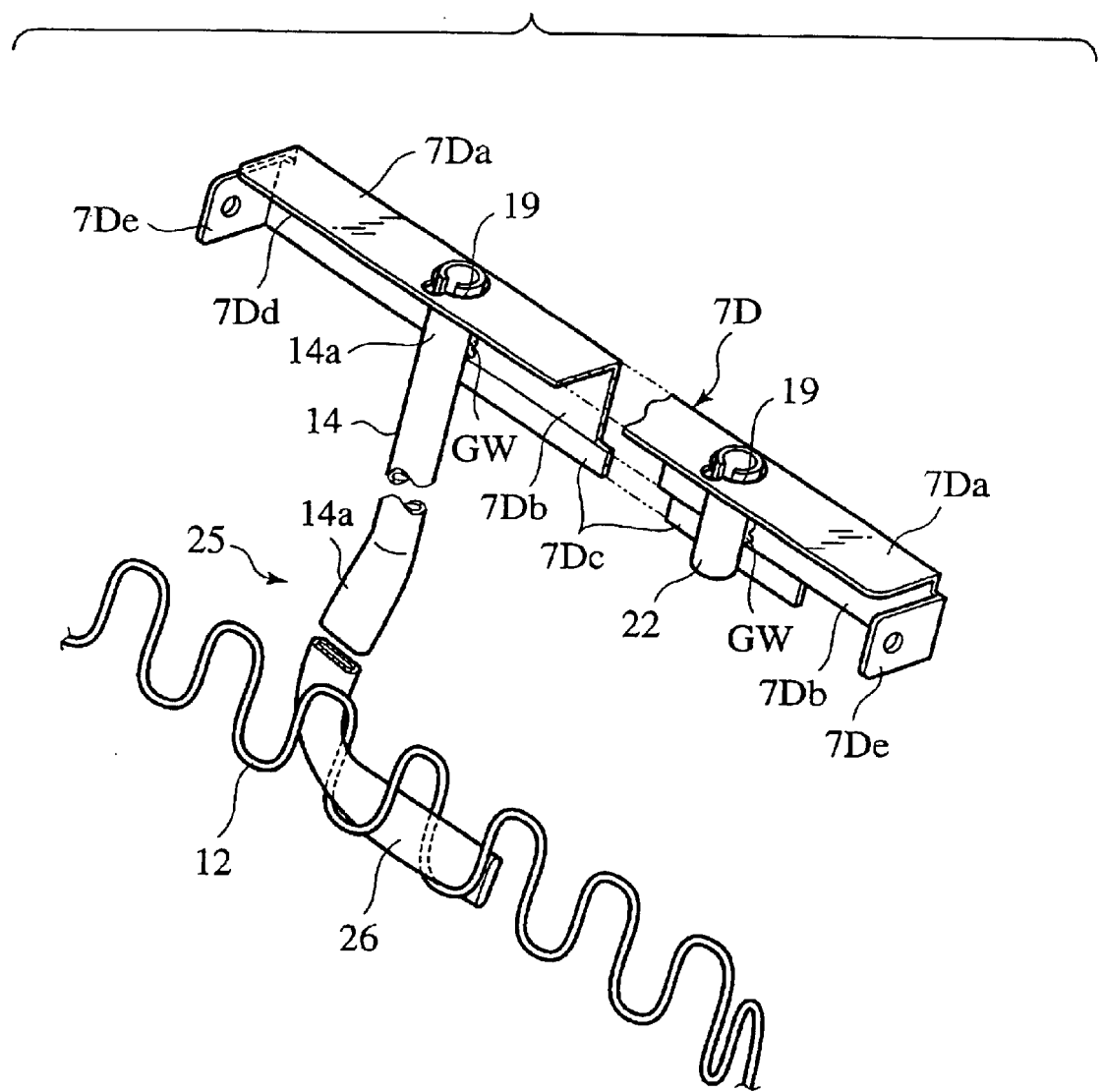
FIG. 14 is a perspective view of headrest holder brackets according to yet another embodiment of the invention.

FIG. 14 shows yet another embodiment of the headrest holder brackets 9. The headrest holder bracket 25 of this embodiment is different from the above headrest holder brackets 9 in that the headrest holder bracket 25 has only one straight portion 14 and curved portion 14a and forms an L shape with a pressure receiving portion 26 when viewed from front. An upper end portion 14a of the straight portion 14 of the headrest holder bracket 25 is supported on the front FR face of the back face portion 7Db of the headrest support member 7D through the weld GW. This embodiment is similar to the third embodiment in that the active headrest return spring 12 is directly engaged with the pressure receiving portion 26.

In such a headrest holder bracket 25, when another car bumps into the rear of the subject car and the impact load is applied, a load that moves the passenger toward the rear side RR is applied to the passenger. Since a value of impact accompanying such a secondary collision is equal to or greater than a load by which the active headrest return spring 12 starts expanding, when the pressure receiving portion 26 is moved toward the rear side RR, the active headrest return spring 12 starts expanding, the headrest holder bracket 25 starts pivoting, and the headrest support member 7D for supporting the headrest holder bracket 25 is pivoted toward the front side FR on the shoulder bolts 5 and the bushings 6. Thus, the headrest 3 is controlled such that the headrest 3 is pivoted toward the front side FR through the stay 13 inserted through the headrest holders 16 into hollow portions of the right headrest holder bracket 25 and the retaining member 22 as the left "headrest holder bracket". Therefore, it is possible to reliably retain the head portion of the passenger and to protect the neck of the passenger.

Figure 15:
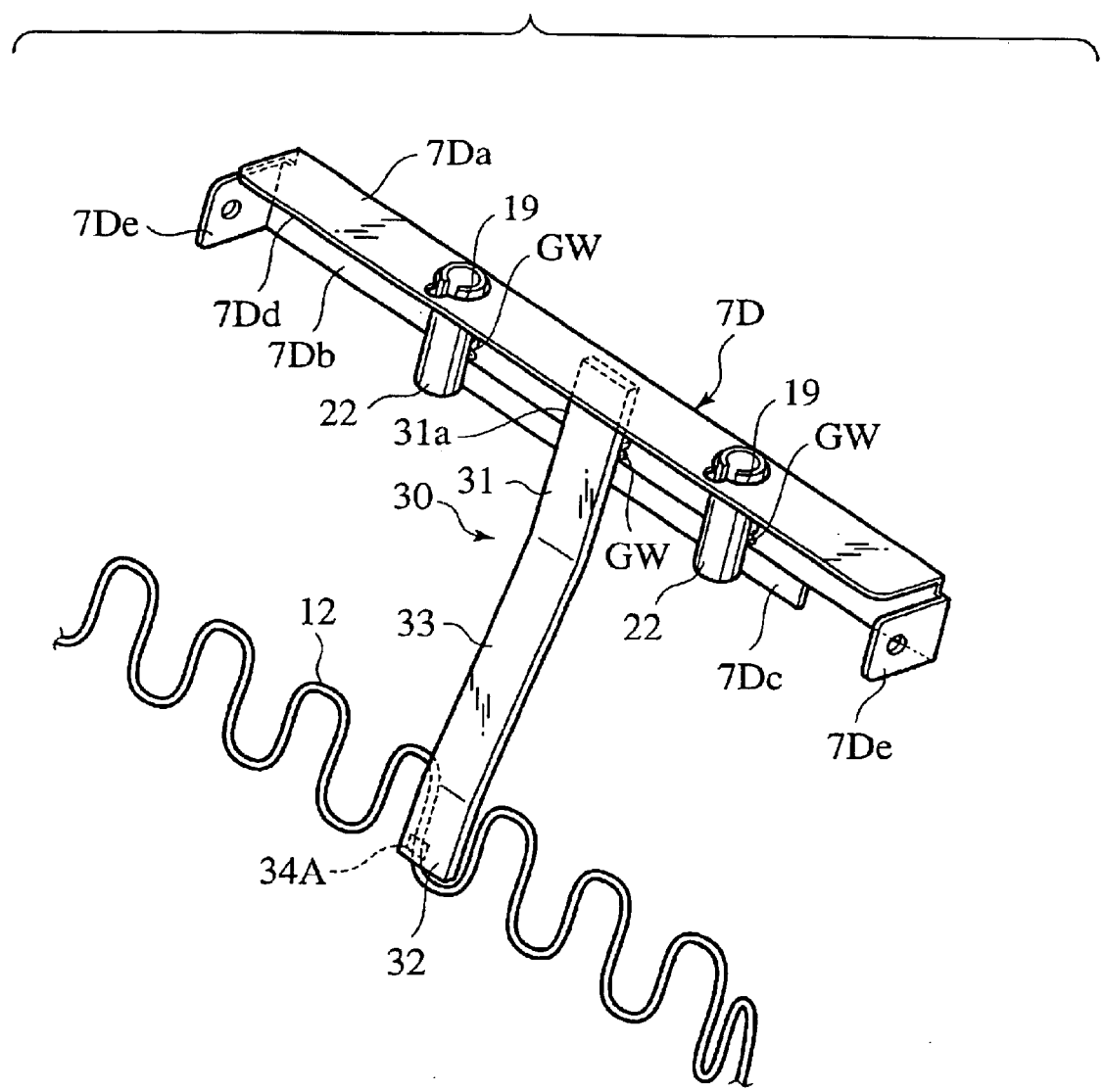
FIG. 15 is a perspective view of headrest holder brackets according to yet another embodiment of the invention.
Figure 16:
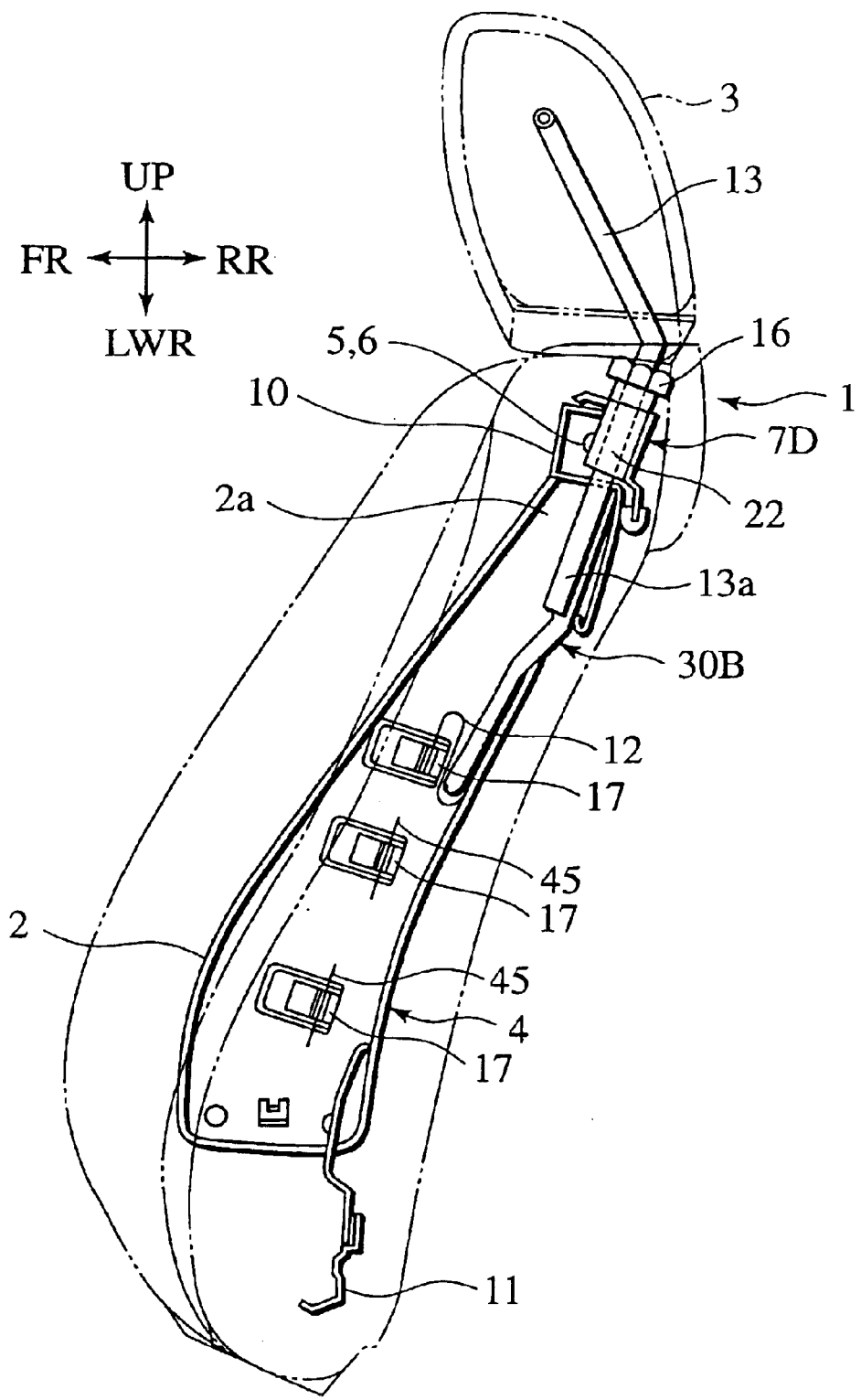
FIG. 16 is a vertical perspective view of a center of a seat back according to a fourth embodiment of the invention.
Figure 17:
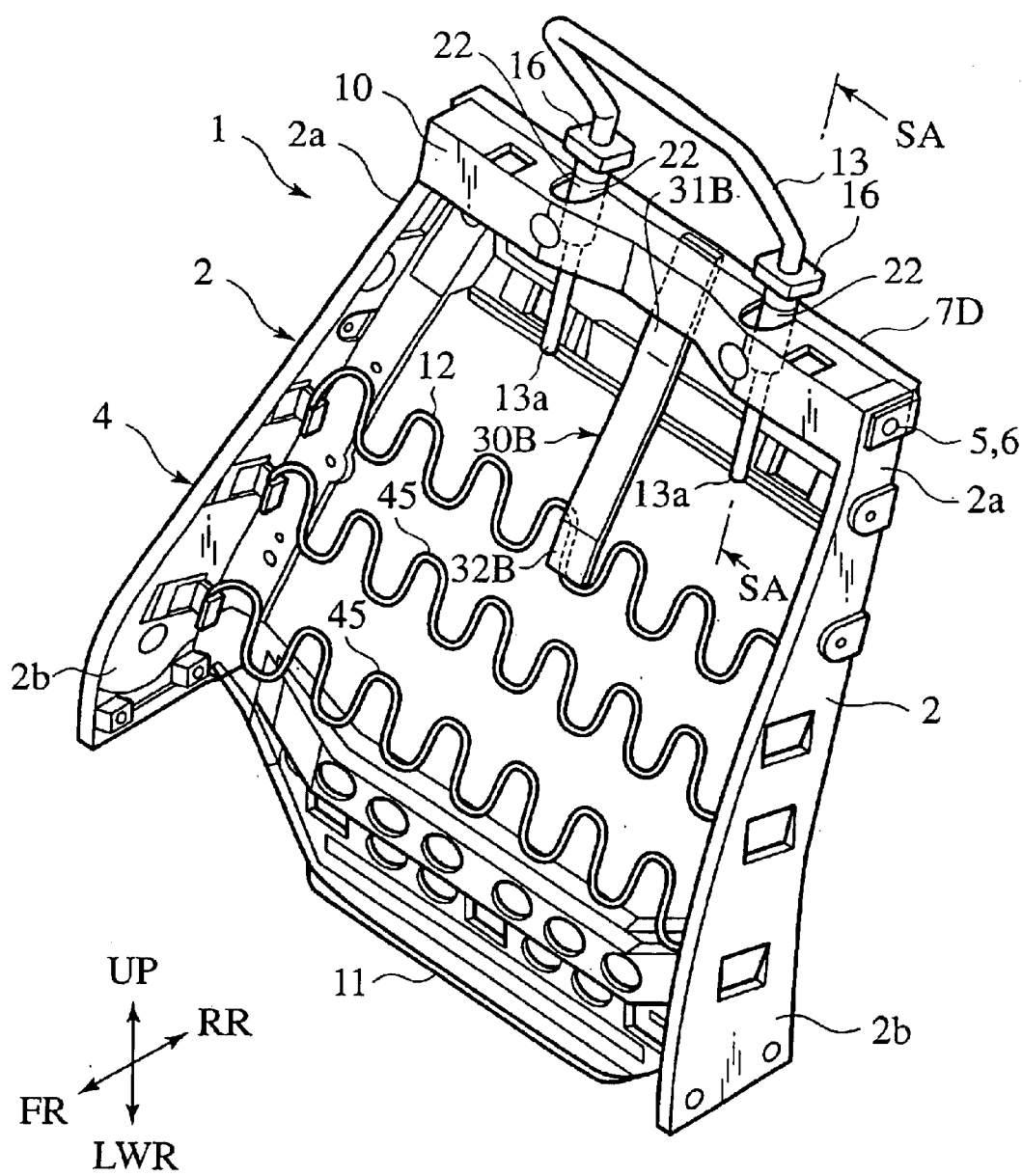
FIG. 17 is a perspective view of the seat back in FIG. 16.

FIG. 15 is yet another embodiment of the headrest holder brackets 9. The headrest holder bracket 30 of this embodiment is different from the headrest holder brackets 9 in that the bracket 30 is different from support means of the stay 13 of the headrest 3 and in an I shape. An upper end portion 31a of a straight portion 31 of the headrest holder bracket 30 is supported on the front side FR of the back face portion 7Db of the headrest support member 7D by the weld GW. The active headrest return spring 12 is directly engaged with the pressure receiving portion 32 of the headrest holder bracket 31 by an engaging portion 34A. A reference numeral 33 designates a connecting member for connecting the upper end portion 31 and the pressure receiving portion 32 that is the lower end portion.

In such a headrest holder bracket 30, when another car bumps into the rear of the subject car and the impact load is applied, a load that moves the passenger toward the rear side RR is applied to the passenger. Since a value of impact accompanying such a secondary collision is equal to or greater than a load by which the active headrest return spring 12 starts expanding, when the pressure receiving portion 32 is moved toward the rear side RR, the active headrest return spring 12 starts expanding, the headrest holder bracket 30 starts pivoting, and the headrest support member 7D for supporting the headrest holder bracket 30 is pivoted toward the front side FR on the shoulder bolts 5 and the bushings 6. Thus, the headrest 3 is controlled such that the headrest 3 is pivoted toward the front side FR through the stay 13 inserted through the headrest holders 16 into hollow portions of the retaining members 22, 22 disposed as the "headrest holder brackets" on left and right sides of the headrest holder bracket 30. Therefore, it is possible to reliably retain the head portion of the passenger and to protect the neck of the passenger.

Although the active headrest return spring is explained as an example of the "biasing means" in the above description, the "biasing means" may be a coil spring, a torsion coil spring, or a torsion bar suspended on the headrest holder brackets 9, 21, 25, and 30.

Fourth Embodiment

FIGS. 16 to 19 show an embodiment of the invention.

The seat back 1 includes a pressure receiving member 30B in a plate shape formed by flattening a pipe in which an upper end portion 31B is supported on the headrest support member 7D through a weld GW and a pressure receiving portion 32B is disposed at a lower end portion for receiving the secondary impact load accompanying the bumping of another car into the rear of the subject car and headrest holder brackets 22 for supporting the head rest 3.

Figure 18:
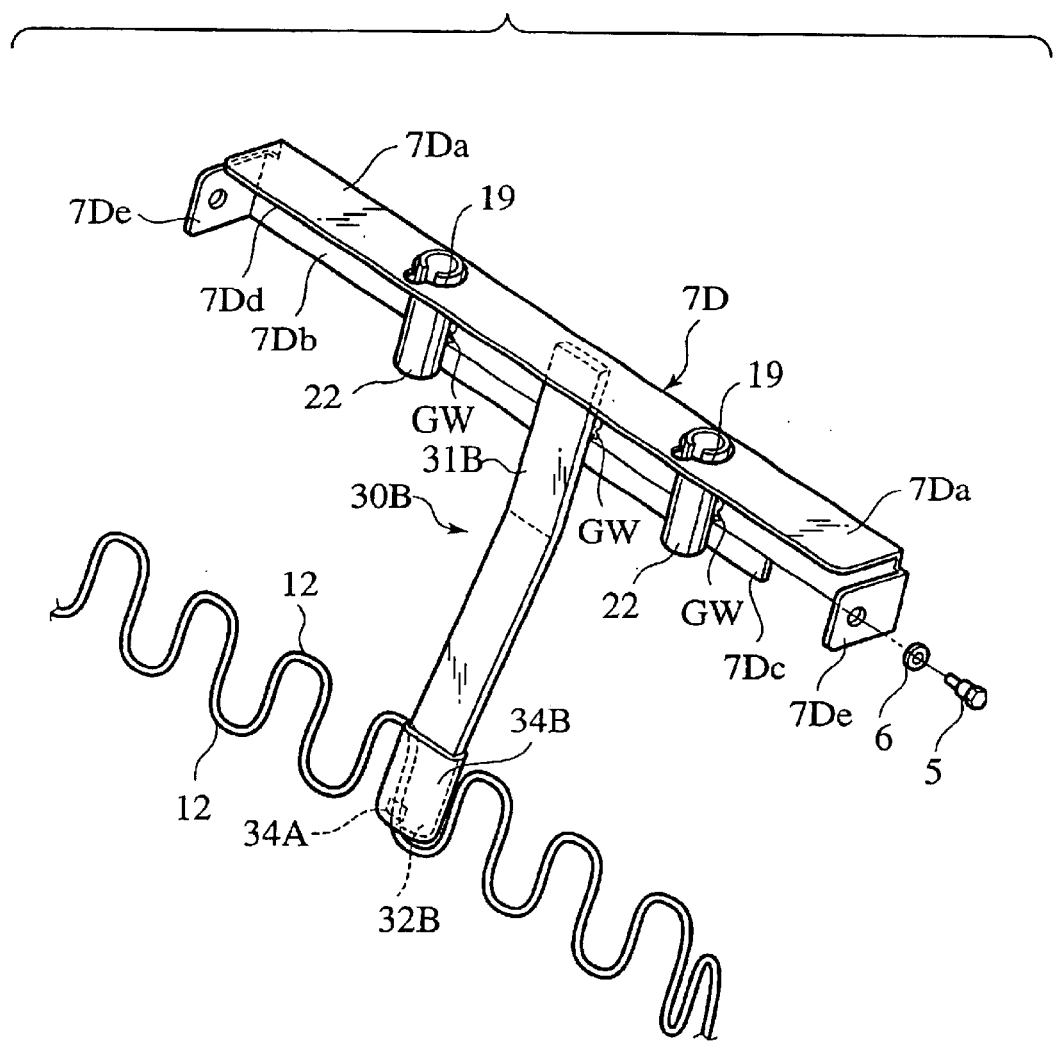
FIG. 18 is an enlarged perspective view of an essential portion of FIG. 2.

As shown in FIG. 18, a lower end portion of the pressure receiving member 30B that is the pressure receiving portion 32B is covered with a cover 34B made of synthetic resin. When a portion of the active headrest return spring 12 is directly engaged with the cover 34B through a lock portion 34A, the pressure receiving portion 32B is continuously biased toward the front side FR. The active headrest return spring 12 has "spring force" such that the spring 12 is not expanded by a sitting load of a passenger (not shown) and can be expanded only by a load of the secondary impact accompanying the bumping of another car into the rear of the subject car.

Figure 19:
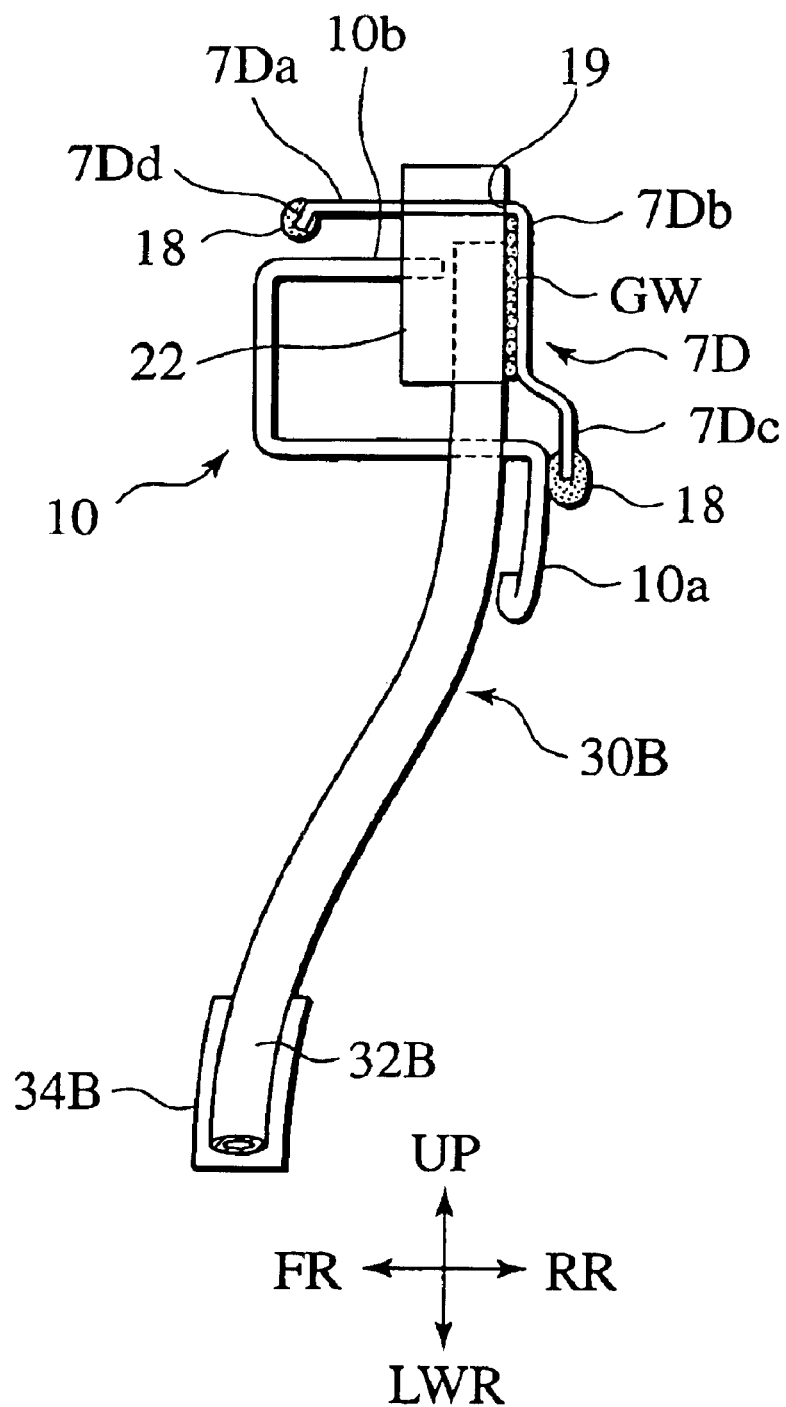
FIG. 19 is a sectional view taken along a line SA—SA in FIG. 17.

As shown in FIG. 19, the headrest support member 7D is formed by bending such that an upper face portion 7Da having vertical through holes 19 through which upper end portions of hollow headrest holder brackets 22 are inserted and extending laterally and horizontally and a back face portion 7Db extending downward from a rear end portion of the upper face portion 7Da along a face of the pressure receiving member 30B on the rear side RR are perpendicular to each other. The upper end portion 31B of the pressure receiving member 30B is supported by the weld GW on the face of the back face portion 7Db on the front side FR.

As shown in FIG. 19, the upper cross member 10 has an angular U shape in section with a front side FR closed and a rear side RR open and a lower member 10a extends downward along the rear side RR of the pressure receiving member 30B. A stopper face 10b for preventing pivotal motion of the headrest support member 7D is formed such that the first stopper portion 7Dd of the headrest support member 7D comes into contact with the stopper face 10b when the headrest support member 7D is pivoted toward the front side FR.

Headrest holders 16 made of synthetic resin are respectively fitted into hollow portions of the headrest holder brackets 22 and stays 13 of the headrest 3 are respectively mounted to the headrest holders 16 for vertical movement. The pressure receiving portion 32B is disposed in a position in a vicinity of a back portion of the passenger (not shown) and near the front side FR. The stays 13 of the headrest 3 extend toward the upside UP to a predetermined position so as to go around portions corresponding to shoulder portions of the passenger (not shown) and are inclined toward the front side FR.

Lower end portions 13a of the stay 13 supported by the headrest holder brackets 22 are exposed from the headrest holder brackets 22. However, lower end portions of the headrest holder brackets 22 themselves are in the headrest support member 7D and do not project and the stay 13 is thin. Therefore, when the headrest 3 pivots toward the front side FR, the lower end portions 13a of the stay 13 pivoted toward the rear side RR project by only small amounts.

Next, operation according to the present embodiment will be described.

If another car bumps into the subject car and an impact load is applied, a load to move the passenger toward the rear side RR is applied to the passenger. Since a value of impact accompanying such a secondary collision is equal to or greater than a load by which the active headrest return spring 12 starts expanding, when the pressure receiving portion 32B is pivoted toward the rear side RR, the active headrest return spring 12 starts expanding, the pressure receiving member 30B having the pressure receiving portion 32B starts pivoting, and the headrest support member 7D supporting the pressure receiving member 30B pivots toward the front side FR on shoulder bolts 5 and bushings 6. By this pivotal motion of the headrest support member 7D, the headrest 3 is controlled such that the headrest 3 is pivoted toward the front side FR through the stays 13 retained in the headrest holder brackets 22 supported by the headrest support member 7D. Therefore, it is possible to reliably retain the head portion of the passenger and to protect the neck of the passenger.

Even if friction is produced between the active headrest return spring 12 and the pressure receiving portion 32B, frictional sound is less liable to be generated because the cover 34B made of synthetic resin is provided between the active headrest return spring 12 and the pressure receiving portion 32B. Since the active headrest return spring 12 is reliably locked by the lock portion 35 formed on the cover 34B, the spring 12 is reliably prevented from being detached, however the pressure receiving member 30B is pivoted.

Since the back of the passenger moves toward the rear side RR due to the impact, the head portion of the passenger that should be left is reliably retained by movement of the headrest 3. Moreover, in this state, since only the lower end portions 13a of the stay 13 of the headrest 3 are thin, the lower end portions 13a of the stays 13 do not project toward the rear side RR and space is maintained between the lower end portions 13a and a passenger in a rear seat when the pressure receiving portion 32B moves toward the rear side RR.

Since the pressure receiving portion 32B of the pressure receiving member 30B is continuously biased toward the front side FR by the active headrest return spring 12, not expanded by a load of sitting, and expanded only by the impact load accompanying the bumping of another car into the rear of the subject car, the active headrest return spring 12 is not expanded in response to the load of leaning of the passenger on his/her back in a normal sitting state of the passenger or in the relaxed state, and the back can be retained. Since the spring 12 can be expanded when the load due to the secondary collision as a result of the bumping of another car into the rear of the subject car is applied, the spring 12 does not hinder movement of the pressure receiving portion 32B and the pressure receiving portion 32B can move reliably.

Although the active headrest return spring is explained as an example of the "biasing means" in the above description, the "biasing means" may be a coil spring, a torsion coil spring, or a torsion bar suspended on the pressure receiving member 30B.

While preferred embodiments of the present invention have been described using specific terms, such description is for illustrative purposes, and it is to be understood that changes and variations may be made without departing from the spirit or scope of the following claims.

What is claimed is:

1. A seatback for an automobile comprising:
   a seatback frame comprising:
      side frames spaced from each other; and
      a cross frame located between the side frames;
   a pivotal connector fixed relative to the seatback frame; and
   a headrest member fixed in relative position to the pivotal connector and supported to be rotatable about the pivotal connector relative to the side frames,
   the headrest member comprising:
      a headrest mounted on the seatback frame; and
      a supporting member including a pressure receiving portion, the supporting member being located between the side frames and supporting the headrest,
   wherein the cross frame is located in front of the supporting member for stopping the supporting member from pivotal motion.

2. A seatback according to claim 1,
   wherein the supporting member comprises:
   a holder fitted with the headrest; and
   a supporting member body fixed with the holder and the pressure receiving portion.

3. A seatback according to claim 2,
   wherein the holder is integrated with the pressure receiving member.

4. A seatback according to claim 3,
   wherein the holder and the pressure receiving member are configured together in a substantially L-shape.

5. A seatback according to claim 3,
   wherein the holder and the pressure receiving member are configured together in a substantially U-shape.

6. A seatback according to claim 3,
   wherein the holder has a straight portion positioned at a central portion of an upper-cross member corresponding to an inside of shoulder portions of a passenger, the straight portion allows a stay of the headrest to be vertically moved, and
   the pressure receiving member is configured in a thin and flat shape and is bent to be placed away from a pad.

7. A seatback according to claim 1,
   wherein the pressure receiving portion is configured in substantially an I-shape.

8. A seatback according to claim 1, further comprising:
   a biasing means fixed between the side frames for biasing forwardly the pressure receiving portion.

9. A seatback according to claim 8,
   wherein the pressure receiving portion is covered with a cover made of a synthetic resin, and the cover has a hook engaged with the biasing means.

10. A seatback according to claim 1,
    wherein the cross frame has a first stopper face configured to stop the supporting member from forward pivotal motion.

11. A seatback according to claim 1,
    wherein the cross frame has a second stopper face configured to stop the supporting member from rearward pivotal motion.

12. A seatback according to claim 1,
    wherein the cross frame is bridged between upper ends of the side frames.

13. A seatback for an automobile according to claim 1,
    wherein the headrest and the pressure receiving portion are disposed on the supporting member on opposite sides of the pivotal connector.

14. A seatback for an automobile comprising:
    a seatback frame including a side frame;
    a pivotal connector fixed relative to the seatback frame;
    a headrest member comprising:
    a headrest fixed in relative position to the pivotal connector and supported to be rotatable about the pivotal connector relative to the side frame;
    a pressure receiving member; and
    a supporting member extending between the headrest and the pressure receiving member and supporting the headrest; and
    a stopper located transversely relative to the side frame and in front of the headrest for stopping the headrest from pivotal motion.

15. A seatback according to claim 14,
    wherein the pivotal connector rotatably supports the supporting member.

16. A seatback according to claim 15,
    wherein the stopper includes a first stopper extending longitudinally relative to the pressure receiving member for stopping the pressure receiving member from rearward pivotal motion.

17. A seatback according to claim 14,
    wherein the stopper includes a second stopper extending transversely relative to the supporting member for stopping the supporting member from frontward pivotal motion.

18. A seatback according to claim 14, further comprising:
    a resilient member biasing the pressure receiving member to an original position.

19. A seatback according to claim 18,
    wherein the resilient member includes a spring bridged between side frames.

20. A seatback according to claim 14, further comprising:
    a cover covering an end of the pressure receiving member.

21. A seatback according to claim 20,
    wherein the cover is made of a synthetic resin.

22. A seatback according to claim 20, wherein the cover has a hook, and a resilient member is engaged with the hook for biasing the pressure receiving member to an original position.

23. A seatback according to claim 14, wherein the pressure receiving member includes a flat end.

24. A seatback according to claim 14, wherein the supporting member comprises:

a collar part enclosing the pivotal element; and a pressure receiving part fixed to the collar, the pressure receiving part extending from the proximal end of the supporting member.

25. A seatback according to claim 14, wherein the supporting member further comprises:

a holder for fitting the headrest therein.

26. A seatback according to claim 25, wherein the holder part is integrated with the pressure receiving part.

27. A seatback for an automobile according to claim 14, wherein the stopper is located on a same side of the pivotal connector as the headrest.

* * * * *